US009158774B2

(12) United States Patent
Achlioptas

(10) Patent No.: US 9,158,774 B2
(45) Date of Patent: Oct. 13, 2015

(54) INTERPERSONAL SPACETIME INTERACTION SYSTEM

(75) Inventor: Dimitris Achlioptas, Berkeley, CA (US)

(73) Assignee: Dimitris Achlioptas, San Jose, CA (US)

( * ) Notice: Subject to any disclaimer, the term of this patent is extended or adjusted under 35 U.S.C. 154(b) by 333 days.

(21) Appl. No.: 13/063,304

(22) PCT Filed: Sep. 14, 2009

(86) PCT No.: PCT/US2009/005138
§ 371 (c)(1),
(2), (4) Date: Mar. 10, 2011

(87) PCT Pub. No.: WO2010/030392
PCT Pub. Date: Mar. 18, 2010

(65) Prior Publication Data
US 2011/0167125 A1 Jul. 7, 2011

Related U.S. Application Data

(60) Provisional application No. 61/096,707, filed on Sep. 12, 2008.

(51) Int. Cl.
| G06F 15/16 | (2006.01) |
| G06F 17/30 | (2006.01) |
| H04L 12/58 | (2006.01) |
| H04W 4/02 | (2009.01) |
| H04L 29/08 | (2006.01) |

(52) U.S. Cl.
CPC .... *G06F 17/30041* (2013.01); *G06F 17/30044* (2013.01); *H04L 12/5855* (2013.01); *H04L 51/14* (2013.01); *H04L 67/18* (2013.01); *H04L 67/22* (2013.01); *H04W 4/02* (2013.01); *H04W 4/028* (2013.01); *H04L 12/5895* (2013.01); *H04L 67/24* (2013.01); *H04L 67/306* (2013.01)

(58) Field of Classification Search
CPC ............. Y10S 707/99933; Y10S 707/99936; Y10S 707/99945; Y10S 707/99948; Y10S 707/99935; Y10S 707/99944; G06F 17/30525; G06F 17/30536; G06F 17/30041; G06F 17/30044; G06F 17/30241; G06F 17/30991; H04L 67/18; H04L 67/24; H04L 67/22; H04L 67/306; H04W 4/02; H04W 4/028; H04W 4/206; H04N 21/25891; H04N 21/422
USPC .......................................................... 709/206
See application file for complete search history.

(56) References Cited

U.S. PATENT DOCUMENTS 6,449,611 B1 * 9/2002 Frankel et al. .................. 1/1
6,487,553 B1 * 11/2002 Emens et al. ................... 1/1

(Continued)

FOREIGN PATENT DOCUMENTS

WO    WO 2007/117124    *    4/2007    .............. G06F 19/00

*Primary Examiner* — Kevin Bates
*Assistant Examiner* — Ronak Patel
(74) *Attorney, Agent, or Firm* — Fenwick & West LLP

(57) ABSTRACT

The present innovation provides a method of establishing a connection between two individuals using an interpersonal spacetime interaction system, including enabling a first user to specify a spacetime event and to provide annotations for the spacetime event, maintaining a spacetime database comprising data objects, each data object corresponding to a spacetime event, querying a spacetime database, using a query that includes at least a specification of a desired spacetime event, said query being initiated by a second user, retrieving information from those data objects in the spacetime database whose corresponding spacetime events are proximate to the desired spacetime event, and providing the retrieved information to the second user.

18 Claims, 13 Drawing Sheets

(56) References Cited

U.S. PATENT DOCUMENTS

| | | | |
|---|---|---|---|
| 7,318,069 B2 * | 1/2008 | Takahashi et al. | 1/1 |
| 2004/0002998 A1 * | 1/2004 | Takahashi et al. | 707/104.1 |
| 2008/0104227 A1 * | 5/2008 | Birnie et al. | 709/224 |
| 2009/0070228 A1 * | 3/2009 | Ronen | 705/26 |
| 2011/0061018 A1 * | 3/2011 | Piratla et al. | 715/781 |

* cited by examiner

INTERPERSONAL SPACETIME INTERACTION SYSTEM

PRIORITY REFERENCE TO RELATED APPLICATIONS

This application claims benefit of International Patent Application No. PCT/US2009/005138, entitled Interpersonal Contact System, filed on Sep. 14, 2009, by inventor Dimitris Achlioptas which in turn takes its priority from U.S. Provisional Application No. 61/096,707, entitled Interpersonal Contact System, filed on Sep. 12, 2008 also by inventor Dimitris Achlioptas.

FIELD OF THE INVENTION

The present invention relates to a system that defines events as subsets of space and time and is able to store, retrieve and manipulate data objects defining such events with the objective of automating and simplifying the process of bringing individuals into contact with each other. Further, the system enables individuals to use mobile devices and personal computers to identify other individuals and objects based on their location in space and time.

BACKGROUND OF THE INVENTION

There are a wide number of applications that can benefit from the ability to determine proximity of individuals and objects in time and space. Specifically, newspapers, local periodicals and online services offer the ability for individuals to locate other individuals that happened to be in a specific cafe, restaurant, or bus bench at a specific time. Further, newspapers, local periodicals and online services offer lost and found services that bring losers of objects into contact with finders of objects.

The concept of spacetime, also commonly referred to as space-time and space time, has been extensively applied in the fields of physics and history. For enabling human interactions, perhaps the closest use has been group calendars and online meeting and event systems that assist individuals and groups to schedule activities. Some online meeting planning systems, such as Microsoft Outlook by the Microsoft Corporation headquartered in Redmond, Wash., enable teams of individuals to schedule meetings that use resources such as meeting rooms. However, the more general concept of spacetime, allowing an individual to define subsets of space and time using a generic representation, such as that provided by GPS coordinates, has not been used to enable individuals unknown to each other to plan, schedule, coordinate and otherwise interact. A general name for a system that enables individuals to interact using a general spacetime coordinate system is referred to herein as an interpersonal spacetime interaction system, or ISIS.

With the growth of online map systems such as Google Maps provided by Google, Inc. of Mountain View, and the MapQuest mapping service provided by AOL.COM headquartered in New York, N.Y. many systems now use a GPS representation of space. For example, some geographic information systems (GIS), a term that refers to systems and applications that store and manipulate geographic information, incorporate a temporal component. That is, they allow the definition of events as portions of spacetime. Spacetime systems have been implemented in the areas of history and transportation. Historical systems have been used to create historical maps that can be interactively explored in space and time by a user. In transportation, spacetime systems are used to track the movement of delivery vehicles. Such systems are not well-suited to enable interaction between individuals.

Recently, several online services, including Loopt and Brightkite have integrated online mapping with the ability to indicate the present location of certain individuals. However, these services focus on mobile devices. Further, they focus on the present moment enabling individuals only to communicate in real-time, and are thus not well-suited to specify times and events in the past or future. Loopt is based in Mountain View, Calif. Brightkite is based in Burlingame, Calif.

One potential use for an ISIS is to enable individuals to interact or meet using personal computers, PCs, or mobile devices. PCs and mobile devices enable individuals to access websites. Further, a growing number of mobile devices are able to run applications that send and receive information across the Internet. The applications may be preloaded onto the mobile device prior to purchase. Alternatively the applications may also download the application from a server that is accessible from the Internet.

Most mobile devices are equipped with high quality display screens that can display photos. Many mobile devices can capture, store and upload photos to an online service that stores photos centrally.

One potential use for ISIS is to enable individuals that see each other in public locations to make contact. Currently, many factors contribute to preventing individuals from introducing themselves based solely on chance meetings, or physical proximity in public places. For example, one person may be engaged in a conversation with a friend and the other person doesn't want to interrupt or might be embarrassed to do so. The growth in online dating services strongly indicates that there is a market need for services that enable individuals to meet.

Many newspapers and online services enable individuals to attempt to make contact by posting messages that explain the circumstances in which they saw or were in physical proximity to another person and that provide a means for the other person to make contact. For example, the popular website Craigslist offers a "missed connections" section that enables individuals to try and make contact in this way.

In addition, ISIS can be used as the basis for an online lost and found system. Current implementations of lost-and-found services, such as lost-and-found section of craigslist.com, provided by Craigslist Inc. of San Francisco, Calif., require finders to read through a very large number of lost object postings to identify the one that comes from the owner of the lost object, and vice versa. This is because online lost and found systems do not have a fine-grained method for partitioning space. Typically they operate in large metropolitan areas. Moreover, there is no indexing of time, as postings of lost objects are simply listed in the order in which they are received. Thus, such systems have no way of automatically matching a location in space and time when an object was lost with a location in space and time when an object was found. Because such information is currently described in text there is a considerable burden on both the loser and finder of an object to provide and read sufficient information to enable an object's finder and that object's loser to discover each other. The considerable effort required on the part of both losers and finders of objects may act as a disincentive towards utilizing such a system.

Therefore, there is a need for systems and methods that enable individuals to contact one another based on the automatic detection of the proximity of events in time and space.

SUMMARY OF THE DESCRIPTION

The present invention concerns the ability of individuals to identify and connect with other individuals using mobile devices such as mobile phones and network devices such as Internet connected personal computers. It defines a general system that enables individuals to define events in time and space and annotate them, adds related information to the events to create spacetime data objects, or simply objects, which can be stored, retrieved and manipulated to automate and improve the efficiency of a number of existing human activities. The objective of the present invention, referred to hereinafter as an individual spacetime interaction system, ISIS, is to bring individuals into contact based on automated processing of spacetime objects.

The present invention enables asynchronous communication, i.e. individuals do not have to use the system at the same time or communicate in real time. It enables individuals to contact each other based on their common declaration of interest in proximate portions of spacetime, where proximity provides an indication of closeness in spacetime the definition of which may vary from application-to-application.

The present invention discloses an ISIS, and several embodiments of an ISIS, including an interpersonal contact system and a lost and found system.

One aspect of the present innovation is that it facilitates the ability of individuals potentially unknown to each other to meet in real time, based on physical proximity. It provides a way for individuals to determine if other individuals are interested in meeting them without having to disrupt the other person's conversation or activity or risk the embarrassment of an in-person rejection.

Various embodiments are directed towards enabling a user to define an event in spacetime, annotate the event with information such as a title, a description, and a photo, create a spacetime object, store the spacetime object in a spacetime database and then retrieve spacetime objects, typically created as a result of actions taken by other users, based on a query. Supported query primitives include intersection of events and proximity of spacetime events.

A user interaction method for specifying spacetime events and annotating them with descriptive information such as title and text is disclosed. Further, a user interaction method for formulating spacetime queries based on interactive online map is disclosed.

There is thus provided in accordance with an embodiment of the present invention a method for establishing a connection between two individuals using an interpersonal spacetime interaction system, comprising enabling a first user to specify a spacetime event wherein a spacetime event comprising a subset of spacetime, the specification of which includes a spatial portion and a temporal portion, and to provide annotations for the spacetime event, maintaining a spacetime database comprising data objects, each data object corresponding to a spacetime event, including the specification of the spacetime event, a designation of an owner of the data object, and the annotations for the spacetime event, querying a spacetime database, using a query that includes at least a specification of a desired spacetime event, said query being initiated by a second user, retrieving information from those data objects in the spacetime database whose corresponding spacetime events are proximate to the desired spacetime event, and providing the retrieved information to the second user.

There is further provided in accordance with an embodiment of the present invention a system for establishing a connection between two individuals using an interpersonal spacetime interaction system, comprising a website that enables a first user to specify a spacetime event wherein a spacetime event comprising a subset of spacetime, the specification of which includes a spatial portion and a temporal portion, and to provide annotations for the spacetime event, a spacetime database for storing data objects, each data object corresponding to a spacetime event, including the specification of the spacetime event, a designation of an owner of the data object, and the annotations for the spacetime event; and a web interface for querying a spacetime database, using a query that includes at least a specification of a desired spacetime event, said query being initiated by a second user, retrieving information from those data objects in the spacetime database whose corresponding spacetime events are proximate to the desired spacetime event, and providing the retrieved information to the second user.

A lost and found system embodiment is disclosed that enables the loser of an object to disclose their estimate of the space and time coordinates of lost item and for finders of objects to disclose the space and time coordinates found item and for the system to automatically match loser events with finder events and to provide electronic notifications to the finders. This brings a new level of automation and specificity to lost and found systems since the finder does not have to review a large number of items that are not good candidates because they were not lost at an appropriate time or place. Moreover, finders do not need to describe the found object, only the space and time of their finding, thus greatly minimizing both the effort needed and the possibility of fraud by people posing as losers of the item found by the finder.

There is thus provided in accordance with an embodiment of the present invention a method for bringing finders of objects into contact with losers of objects using an interpersonal spacetime interaction system, comprising enabling a user to specify a spacetime event for a found item wherein a spacetime event is a subset of spacetime, the specification of which includes a spatial portion that corresponds to where an item was found and a temporal portion that corresponds to when an item was found, enabling a user to specify a spacetime event for a lost item wherein the spatial portion of the spacetime event corresponds to where an item was lost and a temporal portion that corresponds to when an item was lost, and to provide annotations for the spacetime event, maintaining a spacetime database comprising two types of data objects, loser data objects, each loser data object corresponding to a spacetime event for a lost item, including a unique identifier for the data object, a specification of the spacetime event, a designation of an owner of the loser data object, and the annotations for the spacetime event, and finder data objects, each finder data object corresponding to a spacetime event for a found item, including a specification of the spacetime event, a designation of an owner of the finder data object, and a list of unique identifiers of loser data objects that tracks notifications of loser data objects, maintaining a user database comprising a record for each user, including an electronic address for the user, querying the spacetime database for matching loser data objects, wherein the matching loser data objects comprise at least one loser data object whose corresponding spacetime event intersects with the spacetime event of a designated finder data object, eliminating from the matching loser data objects those loser data objects whose unique identifiers are already included in the list unique identifiers of loser data objects of the designated finder data object, electronically notifying the owner of the designated finder data object of each matching loser data object, and updating the list of unique identifiers of loser data objects of the designated finder data object to include the unique identifier for each matching loser data object.

BRIEF DESCRIPTION OF THE DRAWINGS

The present invention will be more fully understood and appreciated from the following detailed description, taken in conjunction with the drawings in which.

DETAILED DESCRIPTION

Figure 1:
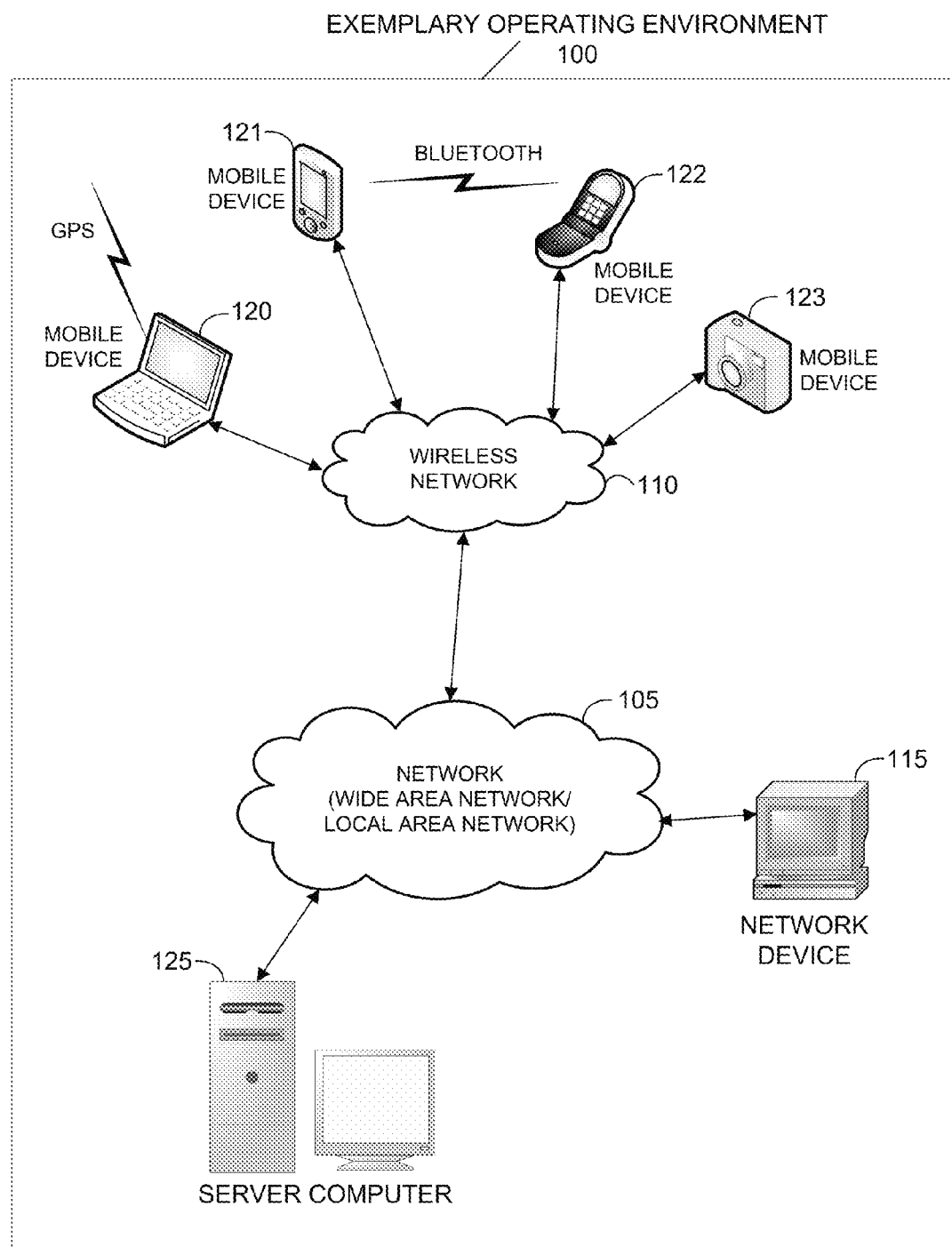
FIG. 1 illustrates an exemplary operating environment in which the invention may be practiced in accordance with an embodiment of the present invention.

The invention will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

Aspects of the present invention concern an interpersonal spacetime interaction system, referred to herein as ISIS, which enables individuals to interact with other individuals as a result of detection of overlap or proximity, or a number of other relationships in spacetime.

Aspects of the present invention concern an interpersonal contact system which is an application of ISIS, which enables a first person, user1, to identify a second person, user2, based on user2's location in time and space, and for user2 to learn of the user1's interest in contacting him/her and optionally to make contact with user1.

Aspects of the present invention concern a lost and found system, which is an embodiment of an ISIS, which enables a first person to disclose the finding of a physical object as a specific spacetime event, and a second person, to disclose the losing of a physical object as a specific spacetime event, and for the lost and found system to bring the first and second users into contact.

As used herein the following terms have the meaning given below:

GPS—refers to the Global Positioning System (GPS), a U.S. space-based radio navigation system that provides reliable positioning, navigation, and timing services to civilian users on a continuous worldwide basis. For Any equipment with a GPS receiver, e.g. a mobile phone or a car, can obtain accurate location and time information anywhere in the world. GPS receivers typically provide latitude, longitude, altitude and time coordinates for the device that includes the receiver, such a mobile phone.

Spacetime—refers to any mathematical model that combines space and time into a single continuum. Spacetime is used herein as a coordinate system that can be used to specify a person or object's location in space and time. Spacetime is defined as an n+1 dimensional mathematical space, where n of the dimensions are allocated to geographical space and one dimension is allocated to time. In the following discussion, the term space refers to geographic space. In the most typical case, used exclusively herein, n=2 and the coordinate system for geographical space is that provided by earth GPS coordinates, latitude (LAT) and longitude (LONG). So, a point in earth-GPS spacetime is a triplet of numbers (x,y,t) where x and y are GPS coordinates and t is a moment in time, expressed, say, as the number of seconds (positive or negative) that have elapsed since the first second of year 0 in the common Gregorian calendar. Also common is the case where n=3, earth-GPS spacetime is expressed as (x,y,z,t) where x,y,z are also provided by GPS.

Spacetime event, or simply event—refers to an arbitrary subset of spacetime. Typical examples include a parallelepiped and a cylinder in 3-dimensional spacetime. Such a subset contains all the points within a certain square or circle in space, say a city block, and within a certain time interval, e.g., between 5 and 6 pm on Friday, Aug. 21, 2009. And the time component may be referred to as its temporal component. The term spacetime event may refer to a specification of a subset of spacetime as well as to the subset of spacetime itself. Likewise the term spatial (temporal) component may refer to the specification of the spatial (temporal) component of a subset of spacetime as well as the spatial (temporal) component of the subset of spacetime itself. Another example of a spacetime event is a curved tube in spacetime. Such a shape could be used, for example, to define the movements of an individual travelling down a street. The individual may be equipped with a mobile device that includes a GPS transmitter that periodically transmits its location within a certain degree of accuracy. Then, as the person moves about within a certain time period, its set of reported spacetime points can be joined by interpolation and expanded to a spatial radius, say 50 feet, around the individual, thus yielding a curved tube.

Spacetime object, or simply object—refers to a spacetime event that is annotated with information such as inter alia a title, owner name or unique identifier, image, textual note. Typically an object is a data object that is stored in a database. Every spacetime object has an event component.

Intersection—means that two events have one or more spacetime points in common. The term intersection can also be applied to objects, meaning that the event components of the two objects intersect.

Interpersonal contact system, also referred to as "icontact system"—means a system that enables persons to identify other persons based on criteria including their mutual location in spacetime, to indicate their interest in contacting specific persons, or to contact persons that have indicated an interest in being contacted or to express a willingness to be contacted.

Proximity—two events are said to be in proximity when they satisfy a relationship indicating a specified degree of closeness. Typically, each ISIS embodiment specifies the proximity relationship in a way that uniquely fits the embodiment. As an example, intersection might be used to determine proximity in some embodiments. A specific proximity relationship is defined hereinbelow for the icontact system.

User—means a person that uses a network device or mobile device to access or use an ISIS, including the interpersonal contact system and lost and found system embodiments as described hereinbelow. A user uses a web application or a web browser such as Mozilla Firefox or Microsoft Internet Explorer running on a client computer or a mobile device that provides access to websites. Examples of mobile devices that run web applications and that provide web access include the Apple iPhone provided by Apple Computer of Cupertino Calif., the Blackberry provided by Research in Motion of Waterloo, Ontario, and the Treo provided by Palm Inc. of Sunnyvale, Calif. Unless otherwise specified, the term user as used herein refers to both the individual and their personal computer or mobile device, i.e. typically the user's computer or mobile device is not referred to separately.

Exemplary Operating Environment

Now reference is made to FIG. 1, which shows an exemplary operating environment in which the invention may be practiced. Not all the components may be required to practice the invention, and variations in the arrangement and type of the components may be made without departing from the spirit or scope of the invention. As depicted in FIG. 1, system 100 includes a network 105 that includes one or more interconnected local area networks ("LANs") and wide area networks ("WANs"), a wireless network 110, a network device 115, four mobile devices 120-123, and a server computer 125. Network device 115 and mobile devices 120-123 are client devices that communicate with server computer 125. Client devices may also communicate among themselves using peer-to-peer networking or using a near field communications system.

Network 105 connects server computer 125 to other computing devices, including, to network device 115, and through wireless network 110 to mobile devices 120-123. Also, network 105 can include the Internet in addition to local area networks (LANs), wide area networks (WANs), direct connections, such as through a universal serial bus (USB) port, other forms of computer-readable media, or any combination thereof. In essence, network 105 includes any communication method by which information may travel between server computer 125, network device 115, and mobile devices 120-123 and with other computing devices as well.

Wireless network 110 is configured in part to couple mobile devices 120-123 with network 105. Wireless network 110 may include any of a variety of wireless sub-networks to connect mobile devices 120-123.

Network device 115 may include virtually any computing device capable of communicating over a network to send and receive information. In this context network device 115 refers to devices that typically connect using a wired or wireless communications medium such as desktop personal computers, laptop personal computers, multiprocessor systems, microprocessor-based or programmable consumer electronics, network PCs, and network appliances.

Generally, mobile devices 120-123 may include any portable computing device capable of receiving and sending a message over a network such as network 105 and wireless network 110. Mobile devices 120-123 include cellular telephones, smart phones, personal digital assistants (PDAs), handheld computers, digital cameras, laptop computers, wearable computers, tablet computers, media players, and video game consoles. Mobile devices 120-123 typically range widely in terms of capabilities and features. For example, a mobile telephone may have a numeric keypad and a few lines of monochrome LCD display on which only text may be displayed. In another example, a web-enabled mobile device may have an alphanumeric keypad and a LCD display capable of displaying full color presentations, digital photos, word processing documents, email messages and web pages.

Mobile devices 120-123 typically include a web browser application that is configured to receive and to send web pages, web-based messages, and other web-based communications. The web browser application may be configured to display and browse web pages and receive and display a variety of media including photos, music, graphics, and text. Mobile devices 120-123 are typically capable of running mobile applications that send and receive content across wireless network 110. Mobile applications may be capable of receiving, sending, creating, and editing text, photos, audio and music, graphics and other digital media files. The mobile application may further provide information that identifies itself, including a type, capability, and name. Mobile devices 120-123 may uniquely identify themselves through any of a variety of mechanisms, including a phone number, Mobile Identification Number (MIN), an electronic serial number (ESN), or other mobile device identifier.

Some mobile devices 120-123 are capable of communicating with external devices in close proximity using near field communications technologies such as, infrared, and Bluetooth.

Further, some mobile devices 120-123 include a geopositioning mechanism such as a GPS transceiver that can determine the physical coordinates of mobile devices 120-123 relative to the surface of the Earth. It is understood that the GPS transceiver may determine a physical location within millimeters in some cases and may be less precise, such as within 5-10 meters or even greater distances, in other cases.

Mobile devices 120-123 and network device 115 may be configured to include an application that enables a user to log into a customer account that may be managed by another computing device, such as server computer 125. Such customer account may enable the user to, for example, search for, view and retrieve information. However, participation in these activities may not require the user to log into a customer account.

Server computer 125 may include any computing device capable of connecting to network 105. Further, server computer 125 enables one or more server applications to communicate with clients and/or other server applications operating on other computing devices. Server computer 125 applications include but are not limited to database management systems, Web server, digital asset management (DAM), e-commerce, social networking, interpersonal contact, and lost and found.

Furthermore, although FIG. 1 illustrates server computer 125 as a single computing device, the invention is not so limited. For example, one or more functions or applications of server computer 125 may be distributed across one or more other network devices without departing from the spirit and scope of the invention.

Interpersonal Spacetime Interaction System (ISIS)

The present invention exploits the concept of a spacetime event to construct an interpersonal spacetime interaction system, also referred to simply as an ISIS.

Figure 2:
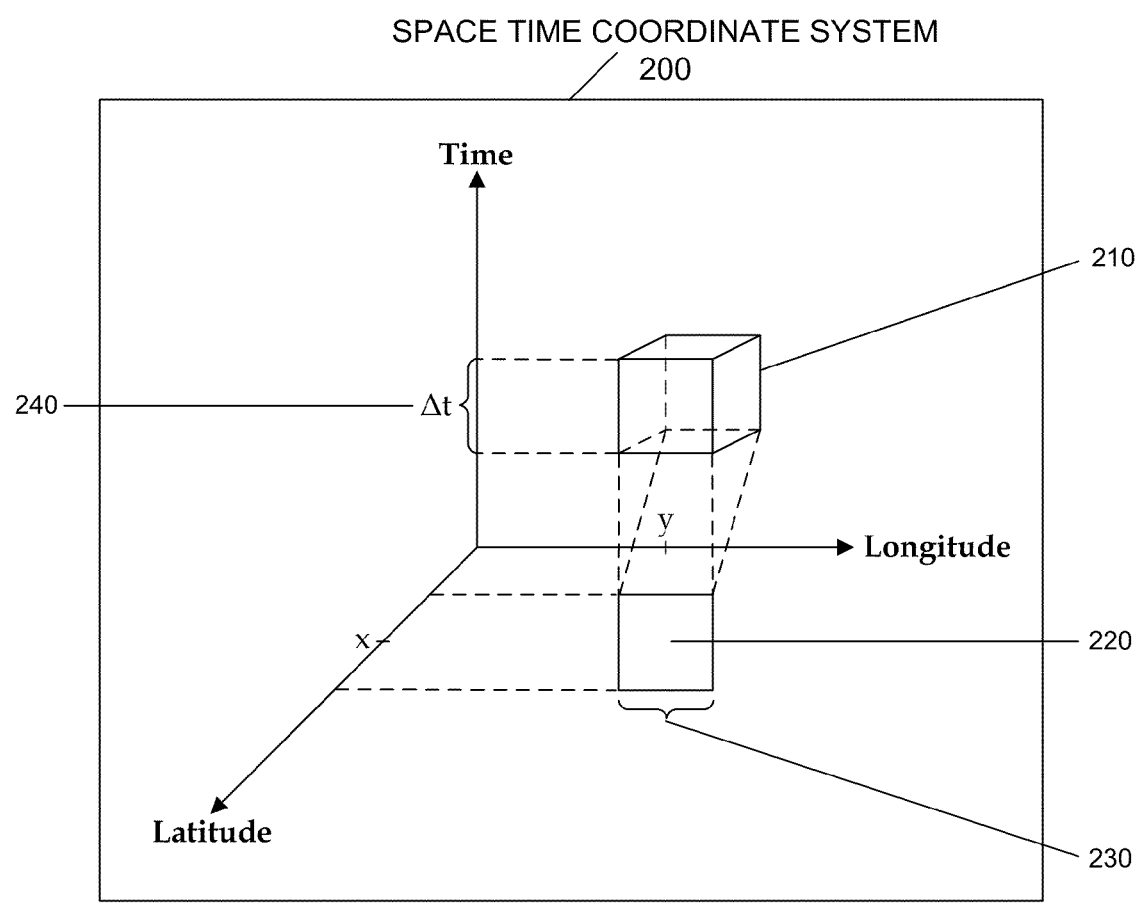
FIG. 2 depicts a spacetime event within a three dimensional coordinate system, in accordance with an embodiment of the present invention.

Reference is now made to FIG. 2, which depicts a spacetime event within a three dimensional coordinate system. In the example depicted in FIG. 2, a spacetime event 210 is represented as a parallelepiped using latitude, longitude and time as the principal axes. A square 220 represents the approximate location of a person or object in space where the reported location of the person or object is at the center of the square. A side 230, defines a square in the latitude-longitude plane around a location defined by the point (x, y). A time interval, Δt 240, defines a time interval centered around the time, t, in the time axis. For example, if the time 10:00 is specified with a Δt of ten minutes, then the spacetime event lasts from 9:55 to 10:05.

An ISIS refers to a system that performs at least the following functions:

1. A user using a mobile device or a network device may specify a spacetime event and optionally provide information, referred to as annotations, related to the spacetime event. Alternatively, the mobile device or network device acting on behalf of the user can specify the spacetime event and provide annotations. These annotated spacetime events are called spacetime objects, data objects, or simply objects.
2. An ISIS creates, stores, manages and retrieves spacetime objects, each of which includes a spacetime event. Moreover, each object is owned by an ISIS user. Further, an object typically includes annotations, also referred to as fields or properties, which provide additional information about the object owner and/or event.
3. An ISIS retrieves objects in response to queries. Queries are typically based on operations involving the event components of spacetime objects including inter alia intersection and proximity. Queries are subject to privacy constraints established by the owner of an object. Queries may also be based on values of annotation fields or keyword searches of annotation text fields.
4. An ISIS system offers methods to bring owners of spacetime objects into contact.

There are many methods by which an ISIS may enable a user to specify an event. In a first method, events can be specified on behalf of a user by a mobile or network device, for example a GPS-enabled mobile device. In one embodiment, the mobile device runs an ISIS mobile application that reports the user's approximate location and the time at regular intervals to the ISIS. In another embodiment, the ISIS mobile application reports the user's approximate location and the time to the ISIS only when requested by the user to do so.

A second method for specifying an event is to use an online map service, such as Google Maps or the MapQuest mapping service to manually enter the spatial component of an event using a web browser. As described below with reference to FIG. 7A, in one embodiment a user selects a point on a map provided by the online map service to denote the center of the spatial component. The system then defines a square centered at this point using a default side length. The user may then, optionally, modify this spatial component within certain system-set limits. Additionally, the user also specifies a time interval T (using a calendar to determine the day and two time sliders to specify an interval start and stop time) to specify the temporal component of a spacetime event. Since an event can be an arbitrary subset of spacetime, the user can repeat this process multiple times in order to signify a single event, as will be described in further detail below with reference to a lost-and-found application of ISIS.

Spacetime objects managed and stored using an ISIS may include annotation, i.e. additional properties or information. Any type of annotation can be included, as long as that annotation can be stored in electronic form in a database. Example data types that can be included as annotations include inter alia digital images, movies, sounds, text and properties such as a privacy flag and user identifier. It may be appreciated by one skilled in the art that the specific set of annotations associated with a spacetime event will differ for each embodiment of an ISIS. Table 1 below provides an example of an object used in the icontact system embodiment described below with reference to FIGS. 3-7.

TABLE 1

Database Fields For A Spacetime Object

| Name Of Field | Description |
| --- | --- |
| Object_id | Unique identifier for the spacetime object. Used as key to access database information about the spacetime object. |
| Owner_id | User identifier (user id) of the owner of the object. May be a user name or a unique identifier. |
| Privacy | A flag that indicates if the privacy status of the object, typical settings are Public or Private. |
| Top Left LAT | GPS Latitude of top left corner, used to the spatial component of an event. |
| Top Left LONG | GPS Longitude of top left corner, used to define the spatial component of an event.. |
| Bottom Right LAT | GPS Latitude of bottom right corner, used to define the spatial component of an event. |
| Bottom Right LONG | GPS Longitude of bottom right corner, used to define the spatial component of an event. |
| Start Time | Start time of the event, in number of seconds since 00:00:00 GMT, Year 0AD. |
| End Time | End time of the event, in number of seconds since 00:00:00 GMT, 0AD. |
| Title | User supplied title for the event. |
| Note | Free text note. |
| Personal_Photo | Digital image associated with the event; for example, a photo of the owner of the spacetime object. |

Database queries are used to access objects stored in the ISIS system. Typically, a query includes a specification of a subset of spacetime (i.e., an event), such as a parallelepiped or cylinder, along with a (potentially empty) set of constraints regarding the annotation information. In response to a query, Q, an ISIS will respond with a subset of spacetime objects stored and managed by ISIS whose event component, i.e. the part of the object that defines the spacetime event, has a specified relationship with the subset of spacetime specified in the spacetime event included in query, Q and whose annotated information satisfy any constraints specified by Q. An example of a specified event-relationship is having a nonempty intersection with Q. In one embodiment, such queries are made using the Structured Query Language (SQL) extended to include spatial extensions in support of geographical information system (GIS) applications, as is discussed in further detail with reference to FIG. 8. An R-tree data structure, used for spatial access methods such as indexing the (X, Y) coordinates of geographical data, is used to index the event component of stored spacetime objects. Once the spacetime objects are stored using an R-tree data structure, the spatial extensions to SQL are used to perform common spatial queries such as intersection, containment, and nearest-neighbor. A common real-world usage for an R-tree might be: "Find all museums within 2 kilometers of my current location". In the context of an ISIS a typical usage, for a query, Q, would be to find all spacetime objects whose spatial components intersect with the event component of Q.

In most cases, a simple query interface based on an online map service is desirable to enable use with little or no training to specify the spatial component of a query. Also, in addition to specifying a subset of spacetime, a query can include constraints on other properties or annotation fields in an object, such as the object_id or owner_id fields in Table 1 above.

The Icontact System—an ISIS Embodiment

An interpersonal contact (icontact) system that enables persons to identify other persons, to indicate their interest in contacting other persons and to contact other persons is an embodiment of an ISIS. Three embodiments of an icontact system are described with reference to FIGS. 3-7. In the first embodiment, users use mobile devices, such as mobile devices 120-123 to communicate with an icontact server. In the second embodiment, users use network devices such as network device 115 to communicate with an icontact server. The third embodiment is a hybrid that incorporates the capabilities of the first two embodiments.

Icontact System—Mobile Device Embodiment

Figure 3:
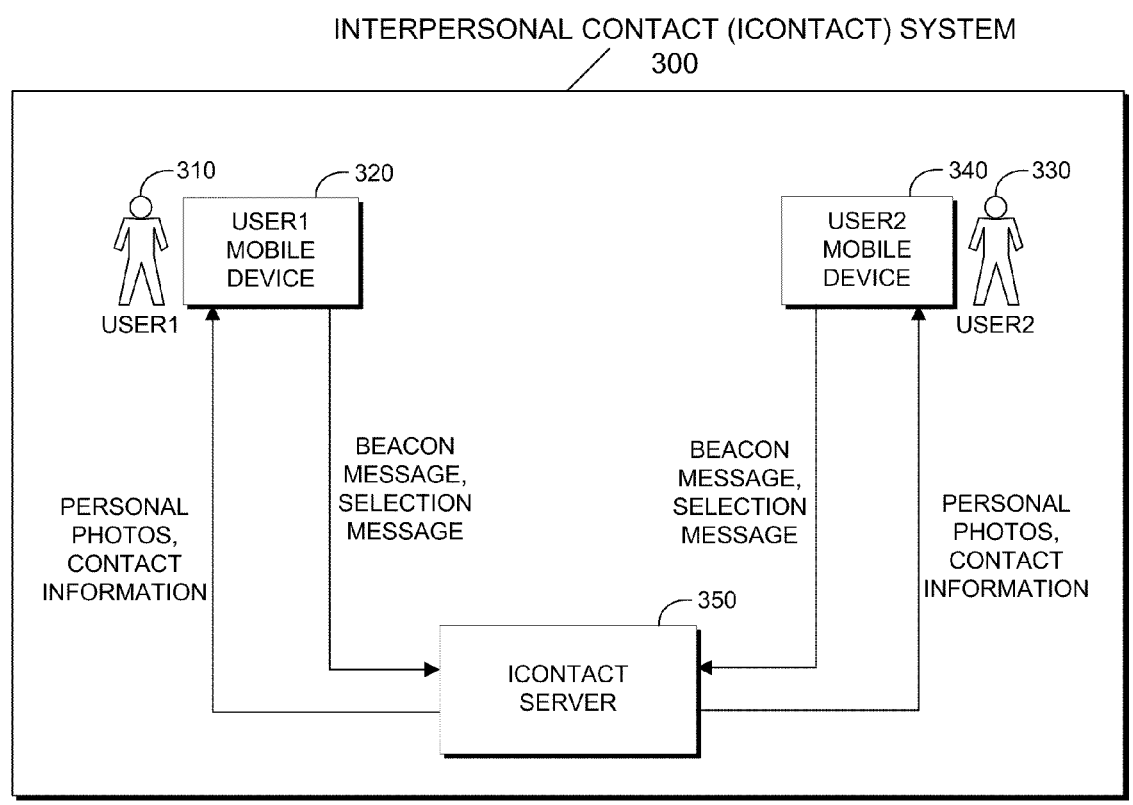
FIG. 3 is a simplified block diagram of an interpersonal contact system that enables users using mobile devices to identify other users, to indicate their interest in contacting other users and to be put into contact with other users, in accordance with an embodiment of the present invention.

Reference is now made to FIG. 3, which is a simplified block diagram of an interpersonal contact (icontact) system that enables persons to identify other persons, to indicate their interest in contacting other persons and to contact other persons, in accordance with an embodiment of the present invention. Icontact system 300, depicted in FIG. 3, includes two users, user1 310 and user2 330. User1 310 uses a user1 mobile device 320 and user2 330 uses a user2 mobile device 340. Both user1 mobile device 320 and user2 mobile device 340 are examples of mobile devices 120-123.

Also, both user1 mobile device 320 and user2 mobile device 340 communicate with an icontact server 350, which is an embodiment of server computer 125, across a wireless network such as wireless network 110 which is connected to a network such as network 105. Further, either or both of user1 mobile device 320 and user2 mobile device 340 may have GPS receiving capability thus enabling it to obtain spatial location coordinates and the current time.

Icontact server 350 is a server computer system that enables users, including user1 310 and user2 330, to register with icontact server 350 and to derive mobile services from icontact server 350.

Further, both user1 mobile device 320 and user2 mobile device 340 run an application, henceforth referred to as an "icontact mobile application". In one embodiment, the icontact mobile application is a web application, provided by icontact server 350, that runs in a web browser in user1 mobile device 320 and/or user2 mobile device 340. In another embodiment, the icontact mobile application is a "native application", that is it runs natively on the mobile device, user1 mobile device 320 and/or user2 mobile device 340, using the services of the mobile operating system native to the device such as Android from Google of Mountain View, Calif., the iPhone operating system from Apple Computer of Cupertino, Calif. and the Pre from Palm Inc. of Sunnyvale, Calif. Further, the icontact mobile application is designed to run on most commercially available mobile devices.

User1 mobile device 320 and user2 mobile device 340 may advertise their proximity to each other, discover their proximity to each other, and send and receive data messages to each other using a proximity-based method. One such method for discovering referred to as "GPS-enabled discovery", each mobile device either periodically, or at the request of its owner, informs icontact server 350 of its own current time and location. Then, icontact server 350 determines which mobile devices are in spacetime proximity to each other.

Therefore, if, for example, user1 mobile device 320 sends a message indicating the location of user1 310 to icontact server 350, icontact server 350 can determine which other users are currently within a specified radius, for example 100 meters, from user1 mobile device 320 and send a message to each of them containing information such as a photo and name of user1 310. It may be appreciated by one skilled in the art, that when GPS-enabled discovery is used, no direct, device-to-device, communication is required between user1 mobile device 320 and user2 mobile device 340.

Figure 4:
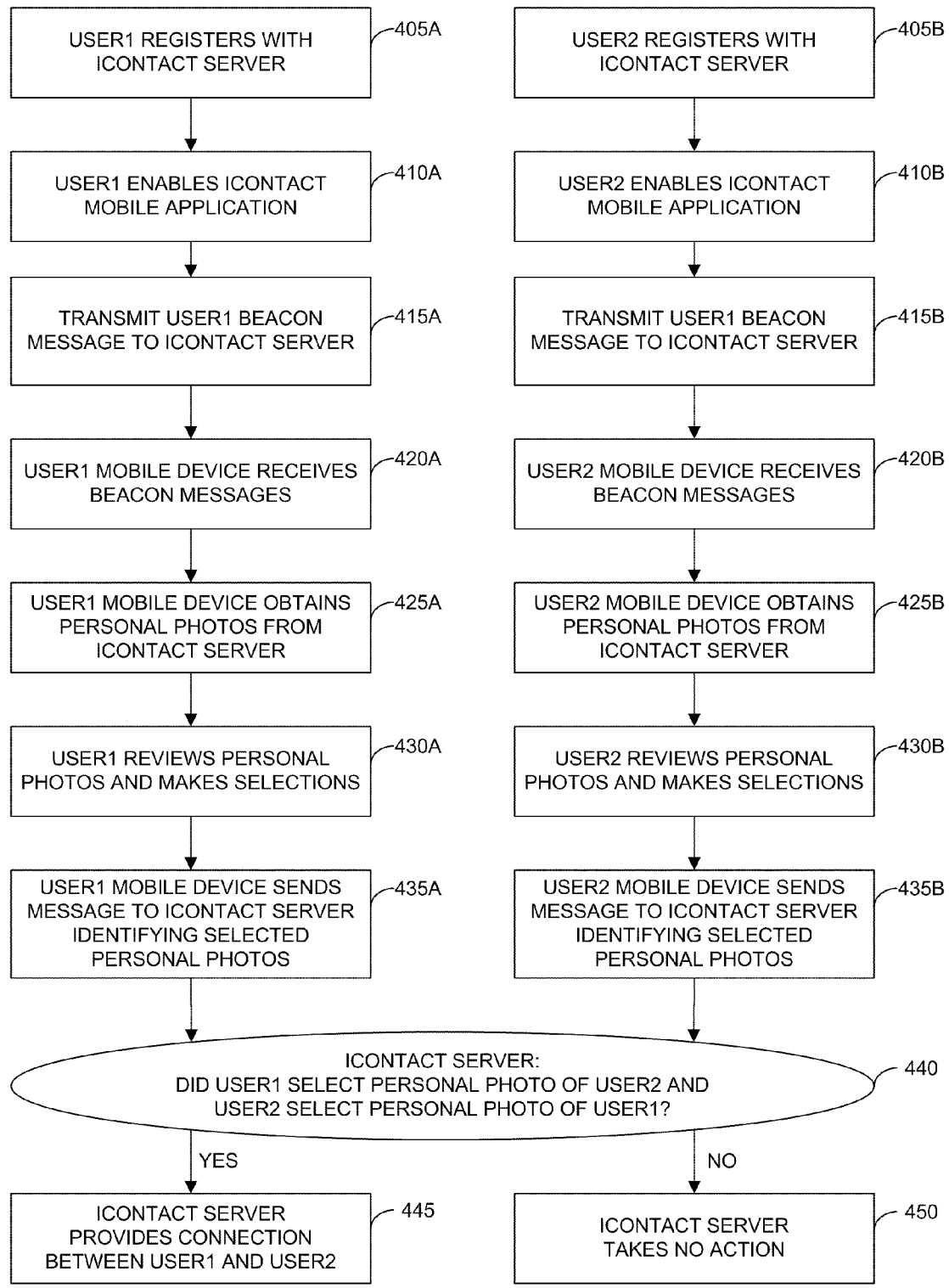
FIG. 4 is a flow diagram that depicts an overall method performed by an interpersonal contact system that enables users using mobile devices to identify other users, to indicate their interest in contacting other users and to be put into contact with other users, in accordance with an embodiment of the present invention.

Now reference is made to FIG. 4, which is a flow diagram that depicts an overall method performed by an interpersonal contact system that enables users using mobile devices to identify other users, to indicate their interest in contacting other users and to be put into contact with other users, in accordance with an embodiment of the present invention. The method depicted in FIG. 4 is symmetric with respect to user1 310 and user2 330, through step 435A and step 435B, that is both user1 310 and user2 330 perform the same method at each step. Thus, at step 405A user1 310 registers with icontact server 350. Similarly at step 405B user2 330 registers with icontact server 350. Accordingly, in the following discussion, only the steps pertaining to user1 310 and user1 mobile device 320, i.e. steps 405A-435A, will be described. It may be understood that steps 405B-435B will be performed identically by user2 330 using user2 mobile device 340. Moreover, while the actions performed by user1 310 and user2 330 are identical they do not need to be performed synchronously; each user's actions are independent of the other in terms of their timing.

At step 405A, user1 310 registers with icontact server 350. User1 310 initiates registration by selecting a "register" control using the icontact mobile application that runs in user1 mobile device 320. The icontact mobile application prompts user1 310 to provide personal information such as name, date of birth, gender and interests. User1 310 may provide this information at his/her option. Then the icontact mobile application prompts user1 310 to select a personal photo and an electronic address such as an email address, text messaging address or some other form of electronic contact such as a link to a profile from a social networking service, as will be discussed later. Only a personal photo and electronic contact means are required. All other information requested of the user during registration is optional for the user. Typically the personal photo is a "head shot," i.e. a photo of a person's head, face forward, which visually identifies him/her. For example, user1 310 may have taken his/her personal photo using a digital camera feature of user1 mobile device 320 or may have taken it using a separate digital camera and then uploaded it to user mobile device 320. After user1 310 provides any required personal information and selects a personal photo, user1 mobile device 320 uploads the personal information and the personal photo to icontact server 350 which stores the information in a user account record.

At step 410A user1 310 enables, or launches, the icontact mobile application that runs on user1 mobile device 320. Enabling the icontact mobile application means that the icontact mobile application running on the user1 mobile device 320 begins operation. User1 310 may disable, or haft, the icontact application at any time.

At step 415A user1 mobile device 320 commences to periodically transmit a beacon message to icontact server 350 indicating its location. In another embodiment, user1 mobile device 320 sends a beacon message only when explicitly requested to do so by user1 310. The beacon message includes an identifier that uniquely identifies user1 320. In one embodiment, the beacon message consists of pseudorandom string, referred to as a handle, that uniquely identifies user1 310. In one embodiment a handle is a 128 bit pseudorandom string that changes every few hours. The beacon message also includes the time at which it is sent. In one embodiment, user1 mobile device 320 is equipped with a GPS receiver and the beacon message includes its GPS coordinates and GPS time at the time that it sends the beacon message.

The beacon message is sent to icontact server 350 which then forwards the beacon message to the mobile devices of users within a defined distance from user1 mobile device 320. Any other user's mobile device that is similarly equipped with the icontact mobile application may receive the beacon message.

At step 420A user1 mobile device 320 receives beacon messages that correspond to other users in the vicinity. User1 mobile device 320 stores each beacon message it receives along with the date/time the beacon message was received and the GPS coordinates of the location of user1 mobile device 320 when it received the beacon message, if such information is available. If user1 mobile device 320 is not equipped with a GPS receiver then it will not store the GPS coordinates. It may be appreciated that as user1 310 travels around during the day he/she may come into proximity with many icontact users and thus user1 mobile device 320 may receive and store many beacon messages.

At step 425A user1 mobile device 320 obtains personal photos from icontact server 350 for each of the users identified by the user handles included in the beacon messages that user1 mobile device 320 has received. User1 mobile device 320 may download said personal photos as a background task such that they are available when, at step 430A, user1 310 chooses to review them. Alternatively, they may be downloaded only when user1 310 explicitly indicates that he/she wishes to review personal photos. It may be appreciated by one skilled in the art that broadcasting only a user handle, rather than a user handle and a personal photo, enhances security and reduces both the power and storage demands for user1 mobile device 320 which are important objectives for mobile applications. In another embodiment, the beacon message may include both a user handle and a personal photo thus eliminating the need for step 425A. In one embodiment, user1 mobile device 320 performs step 425A by sending a request message across the wireless network to icontact server 350. The request message includes a list of user handles that have been received and stored by user1 mobile device 320 since the last time it sent a request message. In turn, icontact server 350 sends the icontact mobile application running in user1 mobile device 320 a personal photo for each user indicated in the request message.

At step 430A user1 310, at his/her convenience, reviews the personal photos using the icontact mobile application running in user1 mobile device 320. The icontact mobile application may display the date/time and, if available, the GPS coordinates associated with each photo. The icontact mobile application enables user1 310 to select a personal photo, discard a personal photo or take no action. If user1 310 discards a personal photo the personal photo and the corresponding beacon message are deleted from user1 mobile device 320. If user1 310 takes no action then the photo and the corresponding beacon message remain in user1 mobile device 320 and can be subsequently reviewed again.

Personal photos selected by user1 in the previous step are processed at step 435A where user1 mobile device 320 sends a selection message to icontact server 350 that identifies any personal photos selected by user1 310. The message includes the user handle corresponding to each personal photo selected by user1 310.

At step 440 icontact server 350 reviews the selection message received from user1 mobile device 320 and for each user selected by user1 310 determines whether the selected user similarly selected a photo corresponding to user1 310. In other words, for each user 2 330 listed in the selection message, icontact server 350 determines whether it has also received a selection message from user 2 330 that identifies user1 310. If so, then at step 445 icontact server 350 provides a connection between user1 310 and user2 330. In one embodiment, providing a connection means providing user1 310 with contact information for user2 330 and providing user2 330 with contact information for user1 310. The respective users may use the contact information as they wish, e.g. they may simply store the information or one user may choose to contact the other. In another embodiment, providing a connection means that icontact server 350 establishes a private communications channel, e.g. a voice call, a chat connection, or the ability to exchange email via icontact server 350, enabling user1 310 and user2 330 to communicate with each other without revealing their contact information.

If at step 440, icontact server 350 determines that user1 310 selected a personal photo corresponding to user2 330 but user2 330 has not selected user1 310 then, in one embodiment, at step 450 icontact server 350 takes no action relative to this selection by user1 310. In another embodiment, at step 450, icontact server 350 notifies user2 330 that "someone is interested" and enables user2 330 to take appropriate action, to find out who that person is. In another embodiment, at step 450, icontact server notifies user2 330 by displaying the photo of user1 and offering user2 330 the possibility of selecting or contacting user1 310. In general, the action performed by icontact server 350 at step 450 can vary to reflect privacy preferences that user1 310 and user2 330 may establish using the icontact mobile application.

Icontact System—Network Device Embodiment

The mobile devices embodiment of the subject invention required that each user of icontact system 300 use a mobile device running the icontact mobile application. However, there are cases where this may not be practical, for example when a user is not carrying his/her mobile device, or when a potential user does not have in his/her possession a mobile device with the icontact mobile application installed. Thus, a network device embodiment of spacetime interaction system, referred to as icontact system 500, requires only that a user, at some point in time, have access to a network device such as network device 115 that is connected to a network such as network 105.

Figure 5:
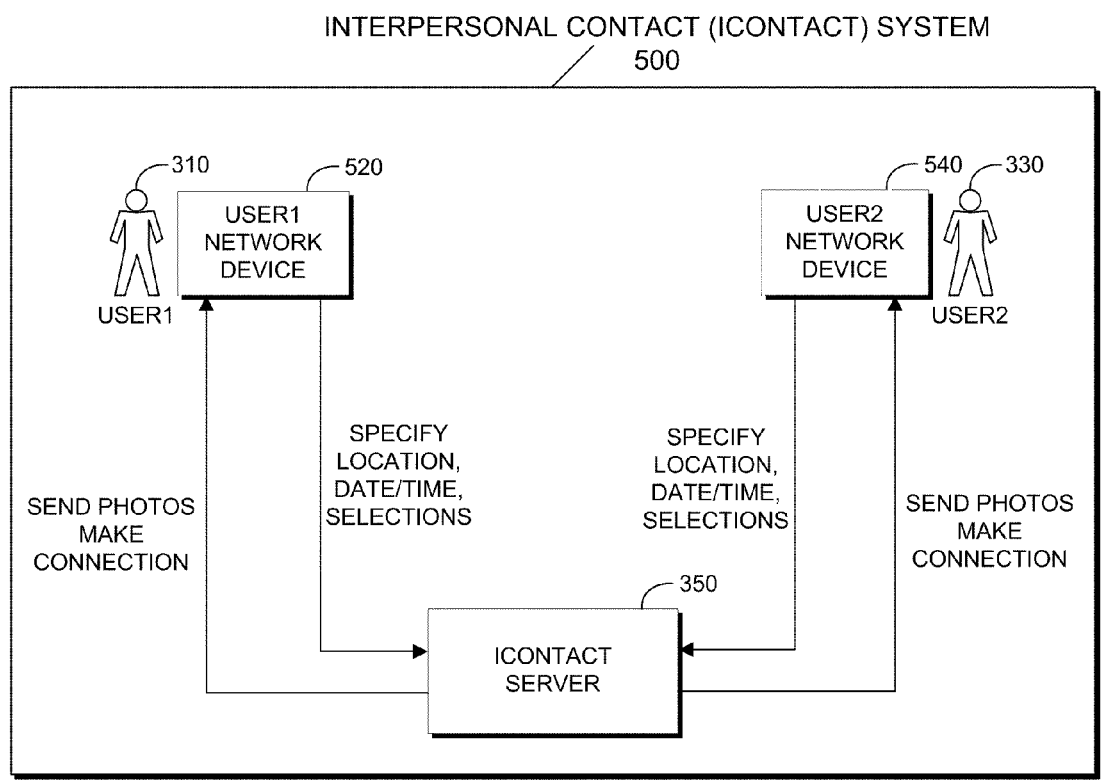
FIG. 5 is a simplified block diagram of an interpersonal contact system that enables users using network devices to identify other users, to indicate their interest in contacting other users and to be put into contact with other users, in accordance with an embodiment of the present invention.

Now reference is made to FIG. 5, which is a simplified block diagram of an interpersonal contact system that enables users using personal computers to identify other users, to indicate their interest in contacting other users and to be put into contact with other users, in accordance with an embodiment of the present invention. Shown in FIG. 5 are two users, user1 310 and user2 330. It may be noted that user1 310 and user2 330 may be the same users as depicted in FIG. 3 and are therefore are referred to identically. In this embodiment, user1 310 uses a user1 network device 520 and user2 330 uses a user2 network device 540. Both user1 network device 520 and user2 network device 540 communicate with icontact server 350 across a network. Icontact server 350 interoperates with mobile devices such as user1 mobile device 320 and user2 mobile device 340 by performing the functions and methods associated with the first embodiment of the subject invention as described with respect to FIGS. 3-4 and interoperates with network devices such as user1 network device 520 and user2 network device 540 by performing the functions and methods associated with the second embodiment of the subject invention as described below, with respect to FIGS. 5-7.

Further, both user1 network device 520 and user2 network device 540 run a web application, referred to as the "icontact web application". Typically, the icontact web application runs in a web browser such as Microsoft Internet Explorer from the Microsoft Corp. of Redmond, Wash. or Firefox from the Mozilla Foundation of Mountain View, Calif. It communicates with icontact server 350 when user1 310 or user2 330 navigates to an icontact website, i.e. a website provided by icontact server 350. In this regard, in icontact system 500 user1 310 can use the same methods using user1 mobile device 320 running a web browser as he/she would using a web browser running in network device 520 and similarly user2 330 can use the same methods using user2 mobile device 340 running a web browser as he/she would using a web browser running in network device 540. Another way of putting this is that a mobile device running a web browser has the same client relationship with icontact server 350 as does a web browser running on a network device. A principal difference is that since mobile devices typically have smaller screens, the display of the relevant information in the mobile device might be tuned to the specific characteristics of the device, e.g. by using smaller icons.

Figure 6A:
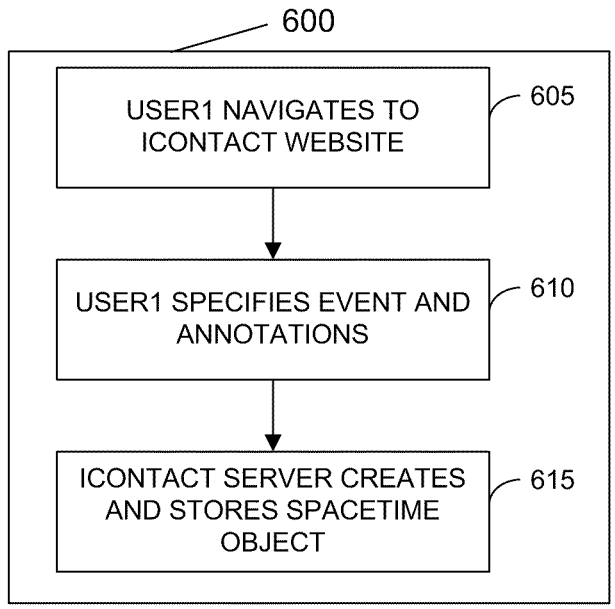
FIGS. 6A and 6B provide a flow diagram that depicts an overall method performed by an interpersonal contact system that enables users using network devices to specify spacetime events, query a spacetime database that stores spacetime objects in order to identify other users, to indicate their interest in contacting other users and to be brought into contact with other users, in accordance with an embodiment of the present invention.
Figure 6A:
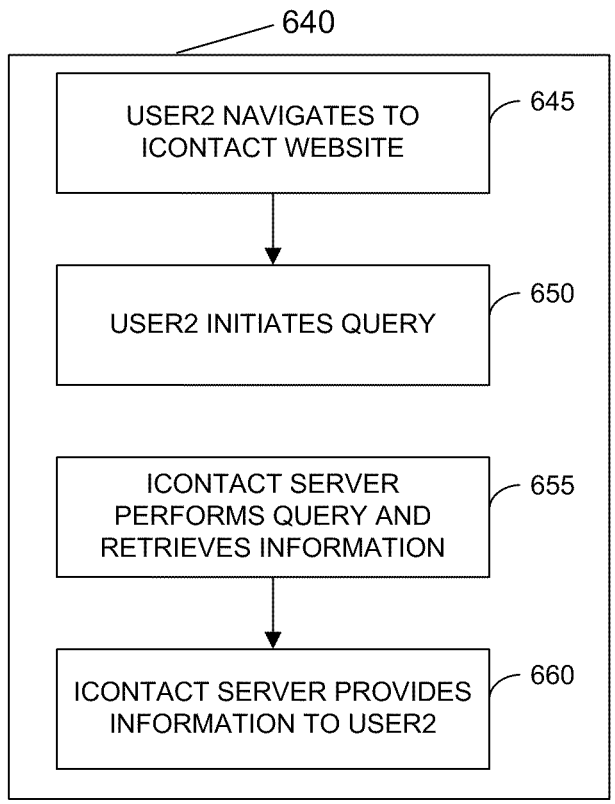
Figure 6B:
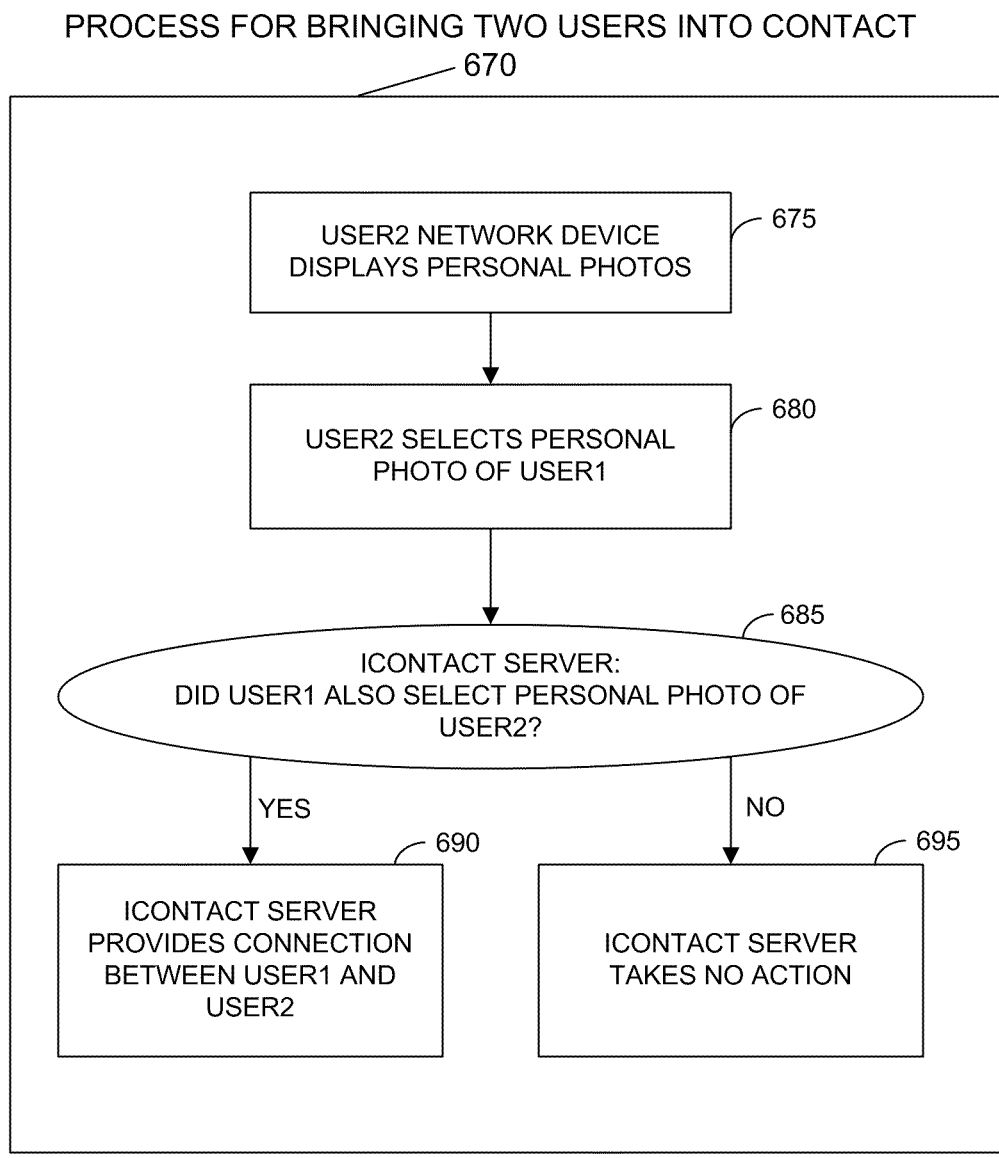

Now reference is made to FIGS. 6A and 6B, which together provide a flow diagram that depicts an overall method performed by an interpersonal contact system that enables users using network devices to specify spacetime events, query a spacetime database that stores spacetime objects in order to identify other users, to indicate their interest in contacting other users and to be brought into contact with other users, in accordance with an embodiment of the present invention. FIGS. 6A and 6B illustrate three methods or processes, a process for specifying a spacetime event 600 and a process for querying a spacetime database 640 and a process for bringing two users into contact 670.

Process for specifying a spacetime event 600 describes how a user, user1 310 in this example, causes both a spacetime event and a spacetime object to be created and stored.

At step 605 user1 310 navigates to the icontact website. If user1 310 has not already done so, he/she registers with icontact server 350 in order to proceed. To accomplish this, user1 310 navigates using his/her web browser to the icontact website and selects a "register" control using the icontact web application. The icontact web application prompts user1 310 to provide personal information such as name, date of birth, gender and interests. User1 310 may provide this information at his/her option. The icontact web application further prompts user1 310 to select a personal photo and an email address, or some other form of electronic contact such as a link to a profile from a social networking service, as will be discussed later. Only a personal photo and electronic contact means are required. All other information requested of the user during registration is optional for the user. After user1 310 completes registration, icontact server 350 stores the information in a user account record.

At step 610 user1 310 specifies a spacetime event, by specifying a geographic location and a time interval, and adds annotation information. The geographic location and time typically represent a time and place where user1 310 is currently, plans to be, or was at some point in the past. In this embodiment, annotations include title, text message, and a privacy setting which can be set to a value that indicates that the event and its corresponding spacetime object is public or private. In one embodiment, privacy settings limit other users ability to retrieve and view spacetime events owned by user1 310. The method for specifying location, time and annotations is described in further detail below with reference to FIGS. 7A and 7B.

Figure 7A:
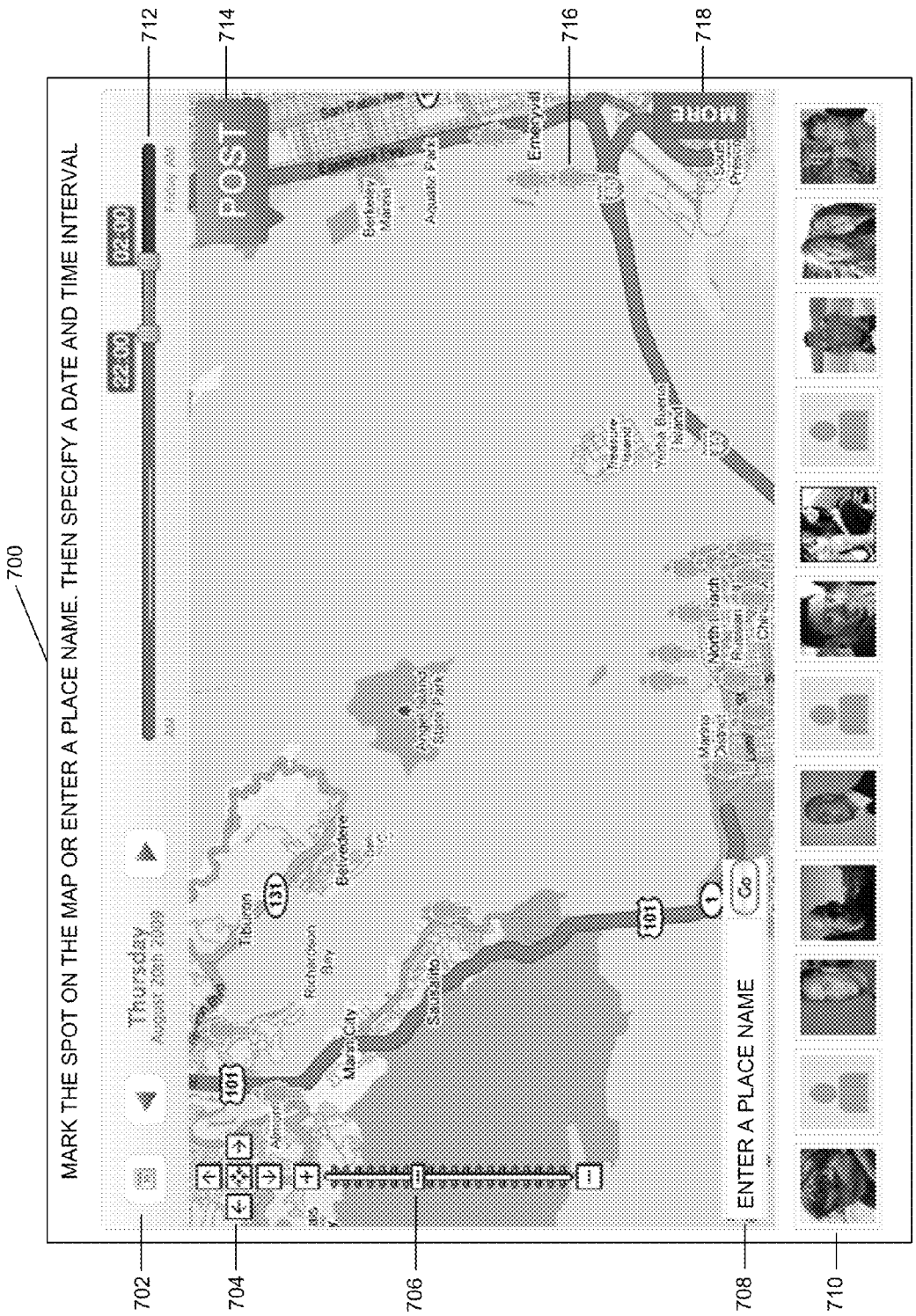
FIGS. 7A and 7B together provide an example user interface that enable an icontact system user to both specify an event in space and time and formulate a query in space and time, in accordance with an embodiment of the present invention.
Figure 7B:
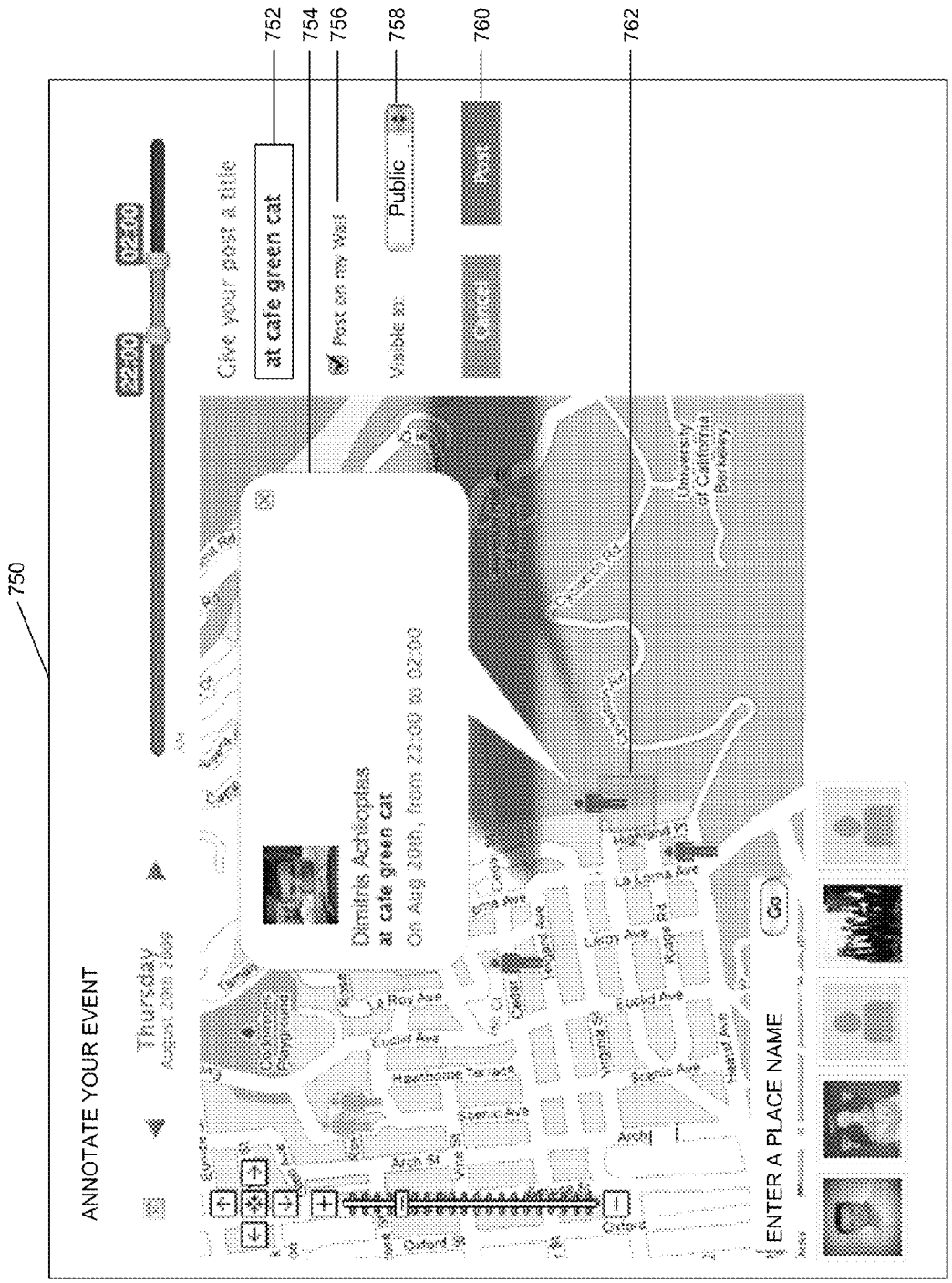

At step 615 icontact server 350 uses the information provided by user 1 310 via the user interfaces given in FIGS. 7A and 7B to create a spacetime object, O, that includes spacetime event E and any user-supplied annotations and then stores spacetime object O in the spacetime database. The spacetime database is further described with reference to FIGS. 8 and 9. To define the spatial component of event E, icontact server 350 establishes a square area centered at the location specified by user 1 310. In one embodiment, the length of the side of the square is a default value specified by icontact server 350. In another embodiment, this side can be adjusted by the user, within system-set bounds. The temporal component of E is defined by the date and start time and stop time specified by user 1 310.

Process for querying a spacetime database 640 describes how a icontact server 350 performs a query, initiated by a user, in this case user2 330. At step 645 user2 330 navigates to the icontact website. If user2 330 has not already done so, he/she registers with icontact server 350, using the procedure described with respect to step 605.

At step 650 user2 330 initiates a query by specifying information that will subsequently be used by icontact server 350 to formulate a query. The information specified includes an area in space, a date and a time interval. The area in space and the time interval typically represent a place and time where user2 330 currently is, plans to be, or was at some point in the past. It may be appreciated by one skilled in the art that this general mechanism enables spacetime events to occur at any time in the past, present or future.

At step 655 icontact server 350 uses the information specified by user2 330 to formulate and execute a query and to retrieve information from those spacetime objects in the spacetime database that satisfy the query. At step 660 icontact server 350 provides the retrieved information to user2 330 via user2 network device 540.

Process for bringing two users into contact 670 describes one embodiment of a method for bringing two users, user1 310 and user2 330 in this example, into contact. In this embodiment, the information retrieved at step 655 for each spacetime object includes a personal photo of the owner of the event, a specification of the spatial location of the center of the corresponding spacetime event, i.e. its x,y coordinates, and the annotations for the spacetime event. At step 675 user2 network device 540 displays a marker for each retrieved spacetime object that indicates the center of the corresponding event, the personal photo of the owner of the object and may include one or more of the annotations. Such a user interface is described in further detail with reference to FIGS. 7A and 7B.

At step 680 user2 330 reviews the personal photos for each owner of a retrieved spacetime object and selects one or more personal photos. In this example, user2 330 selects the personal photo of user1 310 who happens to be the owner of one of the retrieved spacetime objects. By selecting the personal photo of user1 310, user2 330 indicates that he/she wishes to obtain more information about or contact user1 310.

At step 685 icontact server 350 makes a determination as to whether user1 310 had previously selected a photo corresponding to user2 330. If so, then at step 690, icontact server 350 provides a connection between user1 310 and user2 330. In one embodiment, providing a connection consists of providing user1 310 with contact information for user2 330 and providing user2 330 with contact information for user1 310. The respective users may use the contact information as they wish, e.g. they may simply store the information or one user may choose to contact the other. In another embodiment, if user1 310 and user2 330 each select the other's photo then icontact server 350 establishes a private communications channel, e.g. a voice call, a chat connection, or the ability to exchange email via icontact server 350, thus enabling user1 310 and user2 330 to communicate with each other without revealing their identity.

If at step 685, icontact server 350 determines that user1 310 did not previously select a photo corresponding to user2 330 then at step 695 icontact server 350 takes no action relative to this selection by user2 330. In another embodiment, at step 645, icontact server might notify user1 310 that "someone is interested" and enable user1 310 to take appropriate action.

It may be appreciated by those skilled in the art that there are many potential variations of the methods described with reference to FIG. 4 and FIG. 6. For example, in one embodiment, user1 310 may be able to specify to icontact server 350 that it is permissible to provide his/her contact information to user2 330 regardless of whether user1 selects user2 330. This might be useful, for example, as a way for user1 310 to provide contact information attendees of a professional convention.

In another embodiment, user1 310 may be able to specify to icontact server 350 that he/she wishes to receive contact information for user2 330 in the case that they each select each other's photo, but that icontact server 350 may not provide user1 310 contact information to user2 330, i.e. that user1 310 may receive contact information for user2 330 but not vice versa. This might be useful in a case where user1 310 wishes to maintain privacy but also wishes to allow for contact with user2 330.

Icontact System—Retrieving Objects

An ISIS enables users to access or retrieve objects belonging to other users. For example, the icontact web application enables users to query and retrieve information from spacetime objects in a spacetime database, described below with reference to FIGS. 8 and 9, using a user interface described below with reference to FIG. 7A. Essentially the user interface enables a user to formulate a query by interactively specifying a parallelepiped in spacetime and it is this parallelepiped that acts as the user-specified query. (The parallelepiped is defined by the parallelogram in space and a time interval.) The icontact system displays a representation of each object retrieved as a result of query, Q, The choice of objects retrieved for a query, Q, is performed according to specified rules. An example set of rules that take into account the privacy setting discussed with reference to FIG. 7B are described below. For purposes of brevity, in the following discussion query Q refers to the event component of a query, Q, and event O refers to the event component of an object O.

Public Objects: If a stored object, O, has been declared to be public, for example when the user selects the Public privacy setting depicted in FIG. 7B, then O is retrieved when a query Q is issued by a user, U, if and only if event O satisfies both of the following conditions:
 1. Event O's spatial center lies inside the spatial component of query Q.
 2. Event O's time interval intersects the temporal component of query Q.

The two requirements above, taken in conjunction, define the concept of proximity between an event specified in a query and the event component of a stored object for icontact system 300 and icontact system 500. This definition of proximity is conceptually close to that of intersection between events O and Q, yet it is a slightly more stringent requirement, since it is the spatial center of event O, not just any spatial point of event O, that must lie inside the spatial component of query Q. The rationale is that the more stringent requirement regarding the spatial domain makes it possible to display a visual marker at the spatial center of the returned object on the map, for each returned object.

Private Objects: If a stored object, O, has been declared to be private, then O is retrieved when a query, Q, is issued as a result of an action by a user, U if and only if event O satisfies all of the following three conditions:
 1. Event O's spatial center lies inside the spatial component of query Q.
 2. Event O's time interval intersects the time extent of query Q.
 3. The user, U, has stored in the system at least one object whose spatial center lies inside the spatial component of event O.

The first two requirements above are identical to those for public objects. The last requirement is aimed at maintaining user privacy. It guarantees to the owner of O that the only icontact users who will learn of the existence of object O are those users who, presumably without knowledge of O's existence, have themselves stored an object that satisfies the other two criteria, i.e., is proximate to event O. As a result, by making the spatial component of event O small (and, potentially also the time extent), a user can make it very unlikely that a person will be able to learn of O by accident or by random probing of spacetime. It may be appreciated that this last requirement is asymmetric. That is, storing an object, O, enables its owner to learn of an object, P, belonging to another user, while the owner of P will not necessarily learn of O. As an example, two private objects A, B of identical time extent, may be considered such that the spatial component of A is completely inside B but does not contain the center of B. In this case, object B will be visible to the owner of A, but A will not be visible to the owner of B.

In one embodiment, the results of a query Q may be further refined by filtering the results using annotation information. For example, a user U can request to retrieve only those objects stored whose title contains a certain keyword.

Now reference is made to FIG. 7A which is an example user interface that enables an icontact system user to both specify an event in space and time and formulate a query in space and time, in accordance with an embodiment of the present invention. User interface 700 is a web user interface provided by an icontact mobile device such as user1 mobile device 320 or by icontact server 350 via the icontact website to a user of the icontact web application. In this example, the Google Maps web map service provides a customized map to a user that enables him/her to navigate to and select a location and to specify a date and a time interval. Visual icons, referred to as markers, represent spacetime objects stored by icontact server 350 whose spatial centers lie within the visible map and within the specified time interval. In addition the user can "post" or specify an event that will similarly appear when other users of icontact system 500 use user interface 700.

Using a pan control 704 the user can pan up, pan down, pan right and pan left within the map. Using a zoom control 706 the user can zoom in and zoom out of the map. A date control 702 enables the user to specify a date either by clicking on a calendar icon and selecting a date or by clicking on a right or left arrow to increment or decrement the displayed date by one day. A time interval control 712 provides two sliders that enable the user to specify a time interval.

The user can select a location either by clicking on any point on the map or by entering a "place name", i.e. the name of a known location such as a museum, park or shop, using a place name control 708. After entering a place name the user clicks "Go" to initiate a search. If the place name is successfully found by the map service, the map service displays a new map in which the location corresponding to the place name is positioned in the center.

Each time a new map is displayed in response to a user action, including using pan control 704, zoom control 706, date control 702 or time interval control 712, or searching for a location using place name control 708, a query is initiated by icontact server 350. In effect, the visible map defines the spatial component of the query while together date control 702 and time interval control 712 define the temporal component of the query. Combined, the spatial and temporal components form a parallelepiped in spacetime. In response, icontact server 350 (1) identifies all stored spacetime objects proximate to the event defined in the query, (2) eliminates those spacetime objects that don't meet the privacy constraints, (3) retrieves information from the remaining objects, and (4) provides the retrieved information to the icontact web application.

In turn, icontact web application displays an updated map and displays a marker 716 for each retrieved spacetime object on the map at the center of the spatial portion of the spacetime event included in the spacetime object. The icontact web application also displays an array of retrieved personal photos 710 at the bottom of user interface 700. Array of retrieved personal photos includes a thumbnail size personal photo for the owner of each retrieved spacetime object. The user can click on any thumbnail personal photo in array of retrieved personal photos 710 or alternatively on marker 716 to obtain further details about the corresponding stored object, including text related to the event and/or more information regarding the depicted individual.

To initiate the creation of a new event, the user clicks a post control 714. In response, icontact server provides web interface 750 as described below with reference to FIG. 7B.

Now reference is made to FIG. 7B, which is an example user interface that enables an icontact system user to both specify an event in space and time and formulate a query in space and time, in accordance with an embodiment of the present invention. User interface 750 is a web user interface provided by icontact server 350 to a user of the icontact web application. User interface 750 essentially adds several items to user interface 700 in response to a user selecting post control 714 from user interface 700. To user interface 700, user interface 750 adds a new marker inside an event locator rectangle 762, a user information box 754, a title entry box 752, a wall control 756, a privacy control 758 and a post control 760.

A user specifies a new event in the same way he/she specifies a query, i.e. by positioning event locator rectangle 762 within the map, typically using a drag and drop user interface technique, and by using date control 702 and time interval control 712 to define the temporal component of the event. Pan control 704 and zoom control 706, and place name control 708 are available to the user, as previously described, to assist in specifying the spatial component of the event.

Title entry box 752 enables the user to enter a descriptive textual title for the event. In one embodiment, this is a mandatory field. That is, the user must enter a title in order to post the event.

Using a wall control 756, the user can elect to post the object, including event and annotation information to a social network application such as FACEBOOK. Social networks, including FACEBOOK, are described below with reference to the embodiment entitled "Icontact System-Integration With Social Networks Embodiment."

A privacy control 758 enables the user to determine who has the right to view his/her event. In one embodiment the two privacy control settings are available: Public and Private. The rules that govern which users may see events declared as public and private are described above in the section entitled: "Icontact System—Retrieving Objects." When the user finishes annotating his/her event, he/she uses a post control 760 to post the event. When the user uses the post control 760 to post the event, the icontact web application sends a post event message to icontact server 350 that includes the event information, together with the title, privacy and wall information. In turn, icontact server 350 creates and stores a spacetime object for the event. In creating the object, icontact server 350 adds to the information provided in the post event message the owner id and potentially other information about the owner of the object, for example his/her email address or personal photo. Since the dimensions of the square that specifies the spatial component of the event are not defined in user interface 750 icontact server 350 applies a default setting. In one embodiment, this setting is the same for all locations on earth. In another embodiment, this setting varies for different locations. In another embodiment, the user can specify this setting, up to limits imposed by the system. Alternatively, the user can use post control 760 to cancel the event in which case no object is created and stored by icontact server 350.

Icontact System—Hybrid Embodiment Encompassing Mobile and Network Devices

A hybrid embodiment of the subject invention combines the capabilities of the mobile device embodiment and the network device embodiment. In the hybrid embodiment, user1 310 may use either a user1 mobile device 320 or a user1 network device 520 to obtain services from icontact server 350. Similarly, in the hybrid embodiment, user2 330 may use either a user2 mobile device 340 or a user2 network device 540 to obtain services from icontact server 350.

Enabling both the use of mobile devices and network devices enables many variations and user capabilities. For example, in one embodiment, user1 mobile device 320 may send a beacon message to icontact server 350 periodically to inform icontact server 350 of its location in space and time of user1 310. User2 330 may have been approximately at the same location at approximately the same time at one point during the day as user1 310 during the day and may use his/her user2 network device 540 to post an event using the method described with reference to FIG. 5 to identify and connect with user1 310.

In another embodiment, user1 310 may be in a restaurant and see an old school friend eating across the room. The two make eye contact but rather than interrupt their meal they choose to connect later using either of icontact system 300 or icontact system 500. User1 310 may use the icontact mobile application running in user1 mobile device 320 to identify to icontact server 350 the spacetime event during which he/she was at the restaurant. Then, later, user2 330 may use his/her user2 network device 540 to perform the method described with reference to FIG. 5 to identify and connect with his/her school friend user 1 310. To enable this hybrid embodiment, if user1 mobile device 310 has GPS capability then the icontact mobile application provides a function that enables user1 310 to cause user1 mobile device 320 to send a beacon message to icontact server 350 that causes icontact server 350 to create, and store a spacetime object corresponding to the event. If user1 mobile device 320 does not have GPS capability then user1 310 can use the icontact mobile application to enter a spacetime note that includes location and time information and then cause user1 mobile device 320 to send the message to icontact server 350, Icontact server 350 in turn specifies the spacetime event, and creates and stores a corresponding spacetime object. Further, the icontact mobile application may assist user1 310 by obtaining and providing some or all of the information included in the spacetime note such as date and time and the location of the nearest cellular phone tower.

Icontact System-Integration with Social Networks Embodiment

In another embodiment of an icontact system, some of the services provided by icontact server 350 in the mobile device embodiment, the network device embodiment and the hybrid embodiment are provided via a social networking service. A social network service enables communities of people to share information about their interests and activities. Typically, social networking services are web-based. In some cases, social network services offer application programming interfaces that enable applications to be provided by third party developers that use the services of the social networking service. For example, the third party applications use the web interface and user management services of the social networking service. In addition, social networking services typically enable their users to include information about themselves in a user profile including personal photos and contact information.

FACEBOOK, of Palo Alto, Calif., is an example of a social network service that offers an application programming interface. FACEBOOK offers some of the features present in the icontact web application. For example, a FACEBOOK user must register and typically fills out a profile that captures personal information about the user. FACEBOOK also enables a user to upload and store digital photos and even to designate "profile photos" which are analogous to personal photos. Thus, an icontact application for FACEBOOK may replace the icontact web application by providing the same features as the icontact web application but within the FACEBOOK environment. In one embodiment, when a FACEBOOK user launches the icontact application for FACEBOOK from their FACEBOOK profile page the application displays an interactive electronic map that enables a user to specify a location and enables the user to specify a date and time. Having specified a spacetime location, the icontact for FACEBOOK application computes a spacetime event, annotates it with the relevant user information provided by FACEBOOK, along with annotations such as title and text provided by the user and stores the resulting object in the spacetime database. The icontact for FACEBOOK application then identifies events posted by other users of the icontact for FACEBOOK that are in proximity. The application then proceeds to show those users' FACEBOOK picture and make it possible to send them a message, by selecting their FACEBOOK picture. Thus, users "get to see who has posted nearby" in that for each of the events a user X has posted, he/she gets to see the FACEBOOK-profile picture of the FACEBOOK users who have posted events which are nearby, i.e. proximate in spacetime.

Figure 8:
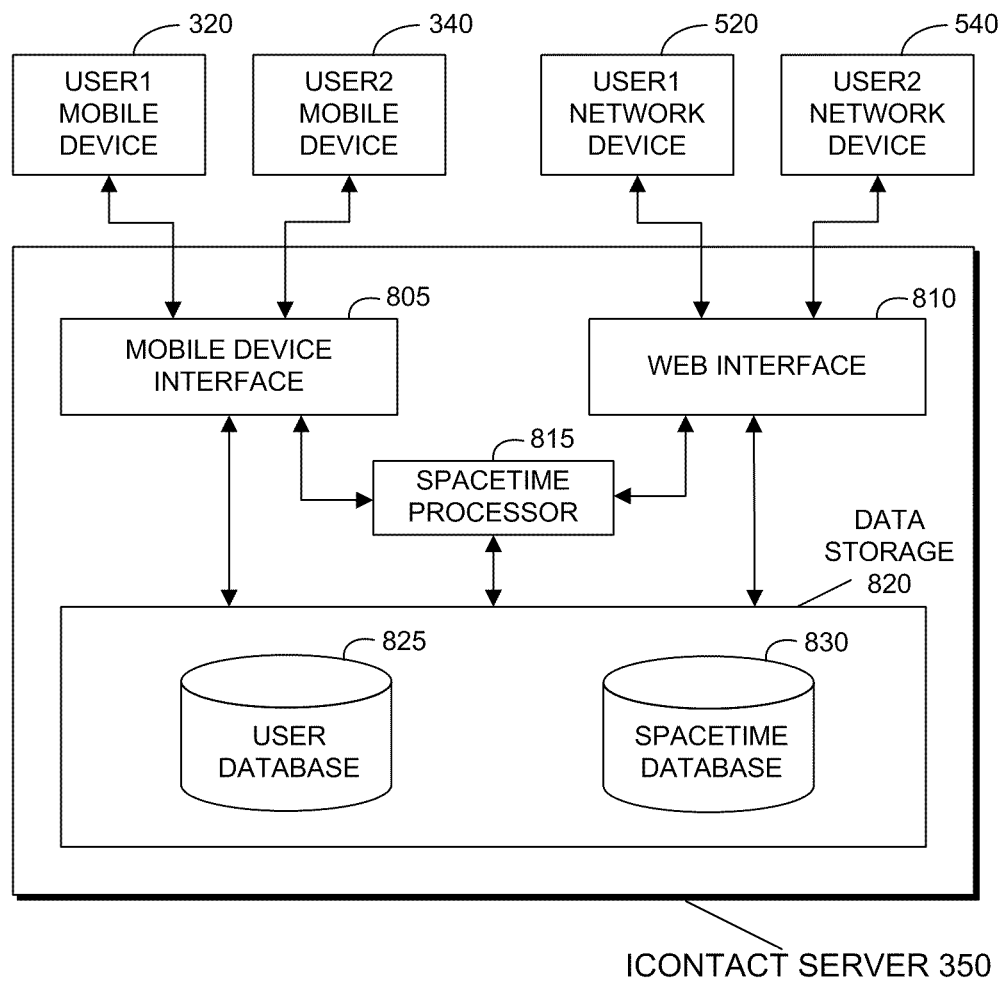
FIG. 8 is an example software architecture of an interpersonal contact system server computer, in accordance with an embodiment of the present invention.

Now reference is made to FIG. 8, which is an example software architecture of an interpersonal contact system server computer, in accordance with an embodiment of the present invention. Icontact server 350 includes a mobile device interface 805, a web interface 810, a spacetime processor 815, and a data storage 820 which includes two databases, namely a user database 825, and a spacetime database 830.

Icontact server 350 communicates with user1 mobile device 320 and user2 mobile device 340 via a mobile device interface 805. Since the processing performed by mobile device interface 805 is identical with respect to user1 310 and user2 330 only the processing relative to user1 310 will be described. Mobile device interface 805 receives beacon messages from user1 mobile device 320 and sends back photos of other users that have posted events in proximity to user1 310. Mobile device interface 805 receives a list of selections made by user1 310 and determines which of the corresponding users have also selected user1 310. For each user in the selection list that is also selected by user1 310, mobile device interface 805 establishes a connection between the two users.

Mobile device interface 805 enables user1 310 to register with icontact server 350. Mobile device interface 805 stores a user account record in a user database 825 for each newly registered user. In one embodiment, the user account record includes contact information including inter alia name, address, email address and phone number, one or more personal photos, and means of payment information such as a credit card number with associated details. The user account record may also include personal preferences such as which personal photo to display and which personal details to provide in the case of a match.

When mobile device interface 805 receives a beacon message from user1 mobile device 320 it uses spacetime processor 815 to specify a spacetime event. Mobile device interface 805 then creates a spacetime object that includes the event specification, the user id for the object owner, and annotations and then stores the spacetime object in spacetime database 830.

Web interface 810 enables user1 310 and user2 330 to obtain services from icontact server 350. Since the processing performed by web interface 810 is identical with respect to user1 310 and user2 330 only the processing relative to user1 310 will be described. It may be appreciated that user1 310 may also access icontact server 350 using a web browser running in user1 mobile device 320. Web interface 810 enables user1 310 to register with icontact server 350 from a web browser running in user1 mobile device 320 or from a web browser running in user1 network device 520. Web interface 810 stores a user account record in user database 825 for each newly registered user. In one embodiment, the user account record includes contact information including name, address, email address and phone number, means of payment information such as a credit card number with associated details and one or more personal photos and a username and password. The user account record may also include personal preferences such as which photo to display and which personal details to provide in the case of a match.

Web interface 810 provides a web user interface that enables user1 310 to provide location and temporal information necessary to specify a spacetime event and annotations to the event. Web interface 810 uses spacetime processor 815 to specify a spacetime event. Web interface 810 then creates a spacetime object that includes the event specification, the owner_id, and annotations and then stores the spacetime object in spacetime database 835. Web interface 810 provides a web user interface that enables a user to specify a query that web interface 810 then uses to retrieve information from spacetime objects owned by other users. Web interface 810 uses spacetime processor 815 to perform the query and return spacetime objects stored in spacetime database 835 that meet the conditions of the query. As previously described with reference to FIG. 6, web interface 810 then enables user1 310 to review and select personal photos for the owners of the events retrieved by spacetime processor 815.

Spacetime processor 815 performs several functions. It creates and stores spacetime objects that includes the specification of a spacetime event, and annotations provided by the owner of the spacetime object. It adds additional information including inter alia a user id for the object owner. Additionally, spacetime processor 815 executes queries and returns information requested for those spacetime objects that meet the conditions of the query.

Data storage 820 creates and manages logical databases using a relational database management system (RDBMS) by storing data onto physical storage devices. In addition, data storage 820 may include network attached storage (NAS), which is data storage that can be connected directly to a computer network to provide centralized data access and storage for other network devices. For example, NAS would enable multiple servers to directly store and share data. Data storage 820 may include cloud storage in which storage resources are provided as a service over the Internet. In particular, data storage 820 provides support for managing database used for geographical information systems (GIS). It does this by supporting basic operations including an R-Tree searching algorithm as previously discussed. Two RDBMS that provide adequate GIS support to be used for data storage 820 are PostgreSQL, which provides a Generalized Search Tree indexing extension, and MySQL which provides spatial extensions. PostgreSQL is an open source object-relational database managed by the PostgreSQL Global Development Group. Additional information about PostgreSQL can be found at http://www.postgresql.org/. MySQL is an open source relational database owned by Sun Microsystems of Santa Clara, Calif.

User database 825 creates, stores and retrieves a customer account record for each user in which it stores information captured during user registration including inter alia name, contact information including electronic address, personal photo, and user id.

Spacetime database 830 creates, stores and retrieves spacetime objects that include inter alia event information, information about the owner of the object including inter alia an owner_id, and annotations provided by the owner of the object.

It will be appreciated by those skilled in the art that the systems and methods of the present invention may be implemented within a variety of server-client network architectures. In this regard, reference is now made to FIG. 9, which is a simplified block diagram of an example client-server architecture for implementing an interpersonal contact system, in accordance with an embodiment of the present invention. On the server side, the architecture depicted in FIG. 8 includes one or more Web application servers 910 managed by load balancers 920, administration servers 930, search servers 940, and two databases, user database 825, and spacetime database 830. Web application servers 930 manage user database 825 and history database 830. It may be appreciated by one skilled in the art that Web application servers 930 also act as Web servers in that they accept HTTP requests from web browsers and serve them HTTP responses along with optional data contents, which usually are web pages such as HTML documents and linked objects (images, etc.). All of these server components are subsumed in icontact server computer 350.

Figure 9:
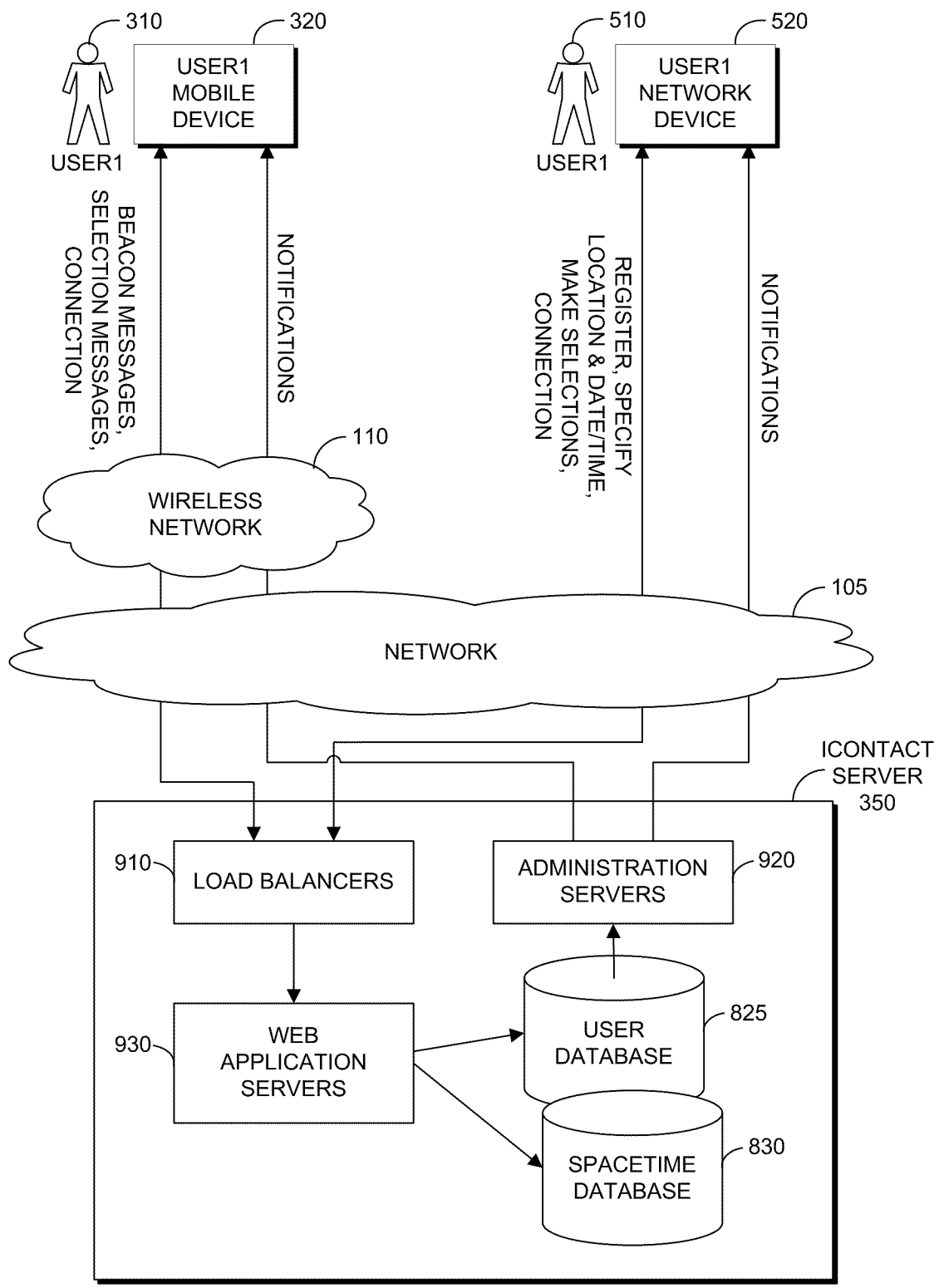
FIG. 9 is a simplified block diagram of an example client-server hardware architecture for implementing an interpersonal contact system, in accordance with an embodiment of the present invention.

On the client side, the architecture depicted in FIG. 9 includes user1 310 and user1 mobile device 320 connected via wireless network 110 to network 105 and hence icontact server 350 and user1 310 using user1 network device 520 and connected via network 105 to icontact server 350. User1 mobile device 320 and user1 network device 520 have one-way connections with administration servers 920 through which they receive notifications. User1 mobile device 320 and user1 network device 520 interact with contact server computer 350 via connections with load balancers 910 which are two-way connections.

Additional Embodiments

The ability of an ISIS to compute spacetime events and to determine when individuals overlap enables a broad range of applications. Other potential ISIS embodiments include:

Event-Based Communities Embodiment

An event-based communities embodiment of an ISIS enables users with common interests to exchange information regarding events of common interest. For example, a user may attend a theater performance and then use an event-based community system to create a virtual "bulletin board" regarding that night's performance by placing a bulletin board place mark at the segment of space time corresponding to the performance, naming the bulletin board with an appropriate name, and perhaps posting an opinion or comment about it. Then other attendees can share their experience by visiting this point in spacetime, discovering the presence of the bulletin board and also posting further messages and information.

Lost and Found Embodiment

In an embodiment of an ISIS directed towards improving the efficiency and likelihood that lost objects will be regained by their owners there are two categories of users, referred to as losers and finders. A loser is a person who has lost a physical object. A finder is a person who has found a physical object. The purpose of the lost and found system is to help the finder of an object to come into contact with the loser of the object.

After losing an object, the loser, L, can use the lost and found system to create an object stored in ISIS whose event component specifies the approximate time and location in which L believes that the item was lost. The ability of ISIS to define an event as an arbitrary subset of spacetime is particularly useful in this embodiment. For example, an event consisting of a "tube" in spacetime can contain the route that L took while walking from location A to location B during which time L lost an object. Alternatively, an event defined by multiple parallelepipeds can represent a handful of locations that L visited in the course a few hours, during which time L believes that he/she lost the object.

Lost and Found Embodiment: Losers' ISIS Objects

In one embodiment of a lost and found system, loser, L, can specify an event as the union of one or more parallelepipeds, where each parallelepiped is as described with reference to FIG. 2. Typically, the number of parallelepipeds is limited to a relatively small number, for example to 3, to limit the possibility of fraud. The multiple parallelepipeds model lends itself to a very simple user interface. For example, a user interface may allow L to select multiple points on a map, each point representing the center of a parallelepiped in which L believes the item may have been lost. In one embodiment the lost and found system defines parallelepiped of a system-defined size for each of the selected points. In another embodiment, the user can select a side to specify the size of the parallelepipeds, within system-set bounds.

As with events specified in the icontact system, each loser-event L may be annotated to create a spacetime object. In one embodiment of a lost and found system, annotations may include:

1. Unique id. A unique id for the loser object.
2. Title. A brief textual description of the lost item, consisting typically of keywords, e.g., black leather wallet.
3. Electronic address. An electronic address such as an email address at which the owner can be reached.
4. Lost object description. A textual description of the object. For example, if L loses a cell phone, this text can contain the manufacturer, model, color and the name and telephone numbers of five contacts stored in the phone's address book.

Lost and Found Embodiment: Finders' ISIS Objects

In this embodiment, a finder object, FO, is a line segment in spacetime. Finder object annotations include the finder's electronic address, and a list of unique identifiers for loser data objects that indicate which loser objects have previously been reported to the finder. Concretely, a finder, F, merely declares a point, P, in spacetime that corresponds to where and when he/she found the item. A line segment, FE, representing the event is then created and a corresponding finder object, FO, is created by extending the time dimension of P backwards either for a system defined length of time, say, a week, or for a length of time chosen by F. This extension in time indicates that F is interested in being put in touch with people who lost an object in the spatial vicinity of the spatial point P, during the time period corresponding to the length of the line segment (since it runs in the time dimension), e.g., the week proceeding the moment user F found the object.

After storing object FO into the system, a finder, F, is notified by the system of all events associated with loser objects, (LE1, LE2, ... ), that intersect the line segment, FE. Moreover, the system notifies the finder, F, of any events that intersect FE that are added to the system in the following D days, where D is a number of days either set as a default by the system or selected by F. A notification may be sent to F each time a new intersecting event is detected, or such notifications can be batched together into a periodic notification. In either case, the notifications are sent to the electronic address that F has associated with FO.

In this embodiment, proximity between an event associated with a loser object and an event associated with a finder object is defined simply as the intersection of the two spacetime events. In the lost and found embodiment all objects are public objects; otherwise put, there is no notion of public or private objects.

Lost and Found Embodiment: Notifications

When the lost and found system detects an intersection between the spacetime parallelepiped defined by LO and the line segment defined by a finder object, FO, it sends a notification to the owner of FO. In one embodiment, the notification consists of an email message containing the title text for LO and a hyperlink that enables finder, F, to view the complete information for LO including the message provided by loser, L.

As a result, Finder, F, can quickly scan any received notifications and only read the full text of those whose title-text appears promising. If one of those lost objects, F finds it worthwhile to communicate with its owner L, then F can proceed to send L a message, e.g., to ask for additional details, or to seek a method by which to return the item.

Similarly to the icontact system 500, the lost and found system can enable communications between L and F by acting as a go-between, forwarding messages so that neither party needs to expose their identity before they are comfortable to do so, if ever. Indeed, Finder, F, can inform Loser, L, that he/she has left the found item at a police station or other location so that the two parties never need to come in contact or reveal their identity.

Figure 10:
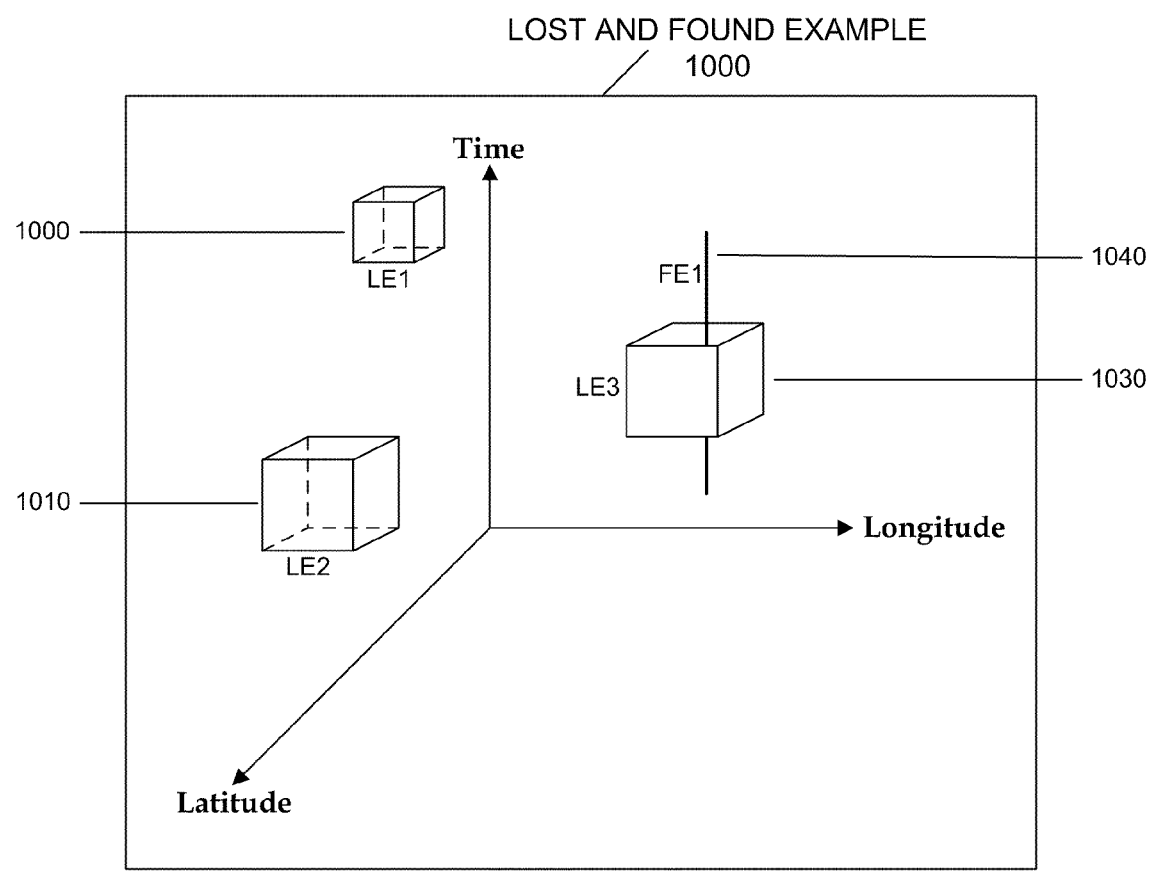
FIG. 10 provides an example of the relationship between events associated with lost objects and events associated with found objects in a lost and found application based on a space time interaction system, in accordance with an embodiment of the present invention.

Now reference is made to FIG. 10, which provides an example of the relationship between events associated with loser objects and the events associated with finder objects in a lost and found system based on a space time interaction system. Lost and found example 1000 includes three events associated with loser objects, LE1 1010, LE2 1020 and LE3 1030. A single finder event FE1 1040 is defined. Finder event FE1 1040 consists of a line segment which intersects loser event LE3 1030. In this example, the owner of finder event FE1 1040 would receive an email notification containing the title text from the object associated with loser event LE3 1030 and a hyperlink that enables the owner of the object associated with finder event FE1 1040 to view the additional information provided by the loser of the object associated with loser event LE3 1030.

Figure 11:
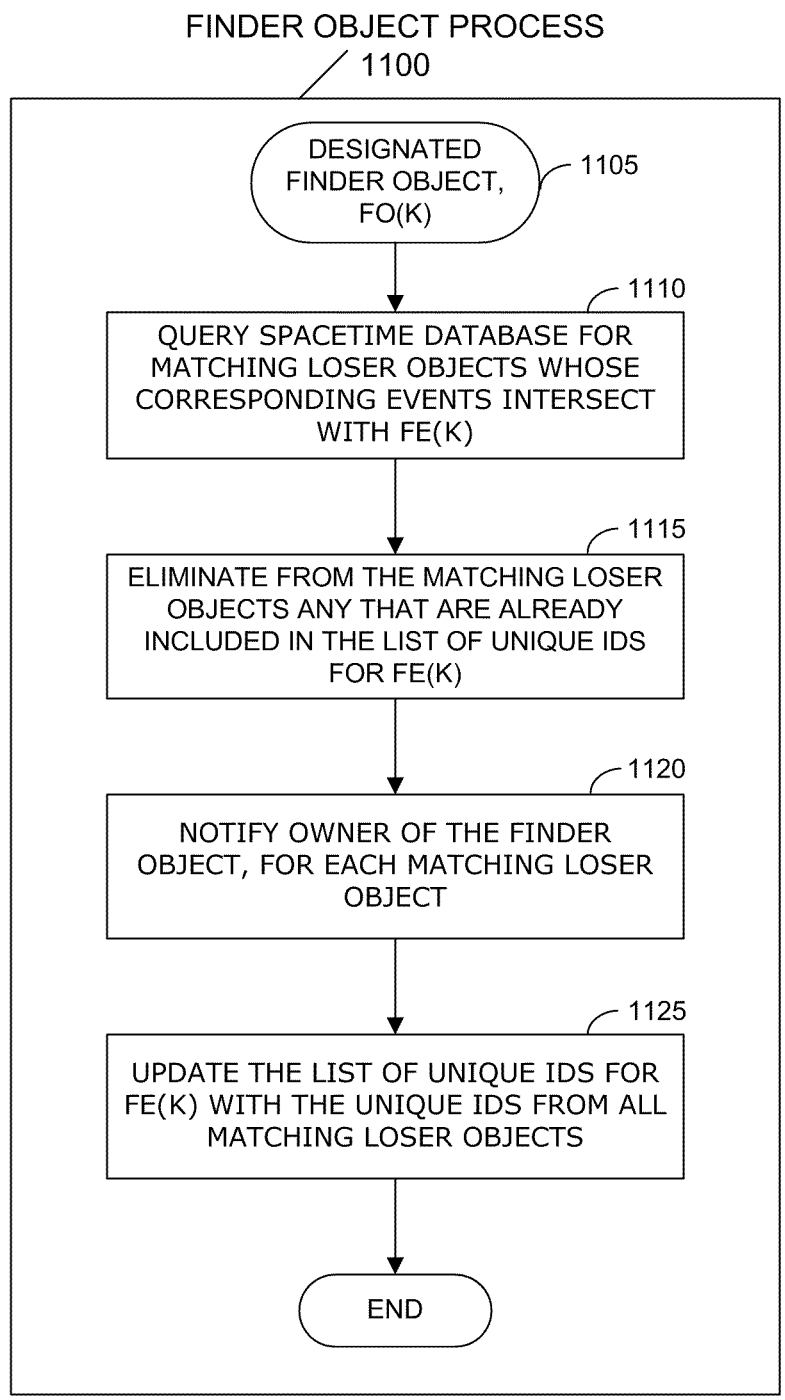
FIG. 11 provides a flow diagram that describes the processing performed by a lost and found system to identify proximate loser objects and finder objects and to notify the owner of the finder object, in accordance with an embodiment of the present invention.

Now reference is made to FIG. 11, which provides a flow diagram that describes the processing performed by a lost and found system to identify proximate loser objects and finder objects and to notify the owner of the finder object, in accordance with an embodiment of the present invention. Finder object process 1100 may be performed periodically for each finder object, FO(K), to ensure that all potential matches between finder objects and loser objects are detected.

At step 1105 the lost and found system initiates finder object process 1100 by selecting a finder object, referred to as FO(K). For example, finder object process 1100 might be executed each time that a new finder object is posted by a user. At step 1110 a spacetime database that stores all finder objects and loser objects is queried to determine if there any stored loser objects that intersect with the event corresponding to FO(K), referred to as FE(K). At step 1115, a set of matching loser objects is determined by eliminating all loser objects whose corresponding events were previously determined to intersect with FE(K). This is performed by eliminating from the set of matching loser objects those loser objects whose unique id is in the list of unique identifiers for loser data objects stored in FO(K).

At step 1120 for each loser object in the set of matching loser objects, the owner of FO(K) is electronically notified of the loser object. In one embodiment, notification consists of sending an email message or other text message to the owner of FO(K) that includes annotations from the loser object, including the title, electronic address, and lost object description. In this embodiment, the owner of the finder object, FO(K), relies on the text annotation provided by the object loser to determine if there is a potential match between the lost and found objects. The owner of finder object, FO(K), can use the provided electronic address to contact the owner of the loser object to resolve the matter.

In another embodiment, notification consists of sending the owner of FO(K) an electronic message that includes the title annotation from the loser object and a hyperlink that leads a web page that displays the lost object description and enables the owner of FO(K) to send a message to the owner of the lost object.

At step 1125 the list of unique identifiers for loser data objects stored in FO(K) is updated to include the list of unique identifiers for each loser object in the set of matching loser objects.

It may be appreciated by one skilled in the art that the lost and found system based on ISIS offers considerable advantages over other approaches. In particular this approach minimizes the chance that false declarations of lost objects will succeed. Moreover, this approach minimizes the effort required on the part of an object loser and an object finder to participate in the lost and found system.

In reading the above description, persons skilled in the art will realize that there are many apparent variations that can be applied to the methods and systems described.

What is claimed is:

1. A computer-implemented method for establishing an electronic connection between two individuals, comprising:
   (a) enabling a first user to specify a first spacetime event, wherein a spacetime event is the union of at least one subset of spacetime and wherein a subset of spacetime comprises a contiguous spatial portion and a corresponding time interval, and wherein the time when the first user specifies the first spacetime event is independent from the at least one time interval specified in the first spacetime event;
   (b) creating, by the computer server, a first data object that corresponds to the first spacetime event, wherein a data object comprises a specification of a corresponding spacetime event;
   (c) storing, by the computer server, the first data object in a spacetime database;
   (d) enabling a second user to specify a second spacetime event, wherein the time when the second user specifies the second spacetime event is independent from the at least one time interval specified in the second spacetime event;
   (e) receiving, by the computer server, the specification of the second spacetime event;
   (f) formulating, by the computer server, a query based on the second spacetime event;
   (g) querying, by the computer server, the spacetime database for matching data objects using the formulated query, wherein a matching data object has a corresponding spacetime event that satisfies a given spatial or temporal relationship with the second spacetime event;
   (h) determining, by the computer server, that the first data object matches the formulated query; and
   (i) retrieving information from the first data object, by the computer server, and electronically providing the retrieved information to the second user,
   wherein said enabling the first user to specify a spacetime event further comprises enabling the first user to designate the first spacetime event as private and wherein said creating the first data object further comprises including a corresponding designation that the data object is private and wherein the given spatial or temporal relationship is proximity of the two spacetime events, and wherein the first spacetime event is proximate to the second spacetime event if (i) the center of the spatial portion of the second spacetime event lies inside the spatial portion of the first spacetime event, (ii) the time interval of the first spacetime event intersects with the time interval of the second spacetime event, and (iii) there already exists in the spacetime database a data object that corresponds to a spacetime event specified by the second user for which the center of the spatial portion of its corresponding spacetime event lies inside the spatial portion of the first spacetime event.

2. The method of claim 1 wherein each spacetime event corresponds to one or more parallelepipeds or one or more cylinders in a three dimensional coordinate system in which two of the dimensions are spatial and refer to points on the surface of the earth and the third dimension is time.

3. The method of claim 1 wherein each spacetime event corresponds to a parallelepiped in a three dimensional coordinate system in which the spatial portion of the spacetime event is a two dimensional rectangular area on the surface of the earth and the temporal portion is a time interval.

4. The method of claim 1 wherein the given spatial or temporal relationship is the intersection of the two spacetime events.

5. The method of claim 1 wherein said enabling a user to specify a spacetime event comprises providing, by the computer server to a client device, a user interface that enables the user to indicate the spatial portion of the spacetime event on an interactive map.

6. The method of claim 1 wherein said enabling a user to specify a spacetime event comprises providing, by the computer server to a client device, a user interface that enables the user to specify a date, and a start time and a stop time of the time interval.

7. The method of claim 5 wherein said enabling the user to indicate the spatial portion of the spacetime event means enabling the user to pan and zoom the interactive map such that a visible portion of the interactive map specifies the spatial portion of the spacetime event.

8. The method of claim 1 wherein each data object further comprises a designation of the user that specified its corresponding spacetime event, the method further comprising:
   maintaining, by a computer server, a user database comprising records for users, each record including an electronic address and a personal photo;
   retrieving from the record in the user database that corresponds to the first user the included personal photo;
   displaying the retrieved personal photo to the second user; and
   enabling the second user to send an electronic message to the electronic address included in the retrieved record.

9. A system for establishing a connection between two individuals, comprising:
   (a) a website that enables a user to specify a spacetime event wherein a spacetime event is the union of at least one subset of spacetime and wherein a subset of spacetime comprises a contiguous spatial portion and a corresponding time interval, and wherein the time when the user specifies the spacetime event is independent from the at least one corresponding time interval specified in the spacetime event;
   (b) a computer server, comprising:
      a spacetime database for storing data objects, each data object corresponding to a spacetime event, including a specification of the corresponding spacetime event; and
      a processor, in communication with the spacetime database, that is programmed:
         to receive from the website a spacetime event specified by a first user;
         upon receiving the spacetime event specified by the first user, to store a corresponding first data object in the spacetime database;
         to receive from the website a spacetime event specified by a second user;

upon receiving the spacetime event specified by the second user, to formulate a query based on spacetime event specified by the second user;

to query the spacetime database, using the formulated query for matching data objects, wherein a matching data object has a corresponding spacetime event that satisfies a given spatial or temporal relationship with the spacetime event specified by the second user;

to determine that the first data object matches the formulated query;

to retrieve information from the first data object; and to electronically provide the retrieved information to the second user, wherein said website that enables a user to specify a spacetime event further enables the user to designate the spacetime event as private and wherein each data object further comprises a corresponding designation of whether the data object is private, and wherein the spacetime event specified by the first user is designated as private and wherein the given spatial or temporal relationship is proximity of the two spacetime events, and wherein the first spacetime event is proximate to the second spacetime event if (i) the center of the spatial portion of the second spacetime event lies inside the spatial portion of the first spacetime event, (ii) the time interval of the first spacetime event intersects with the time interval of the second spacetime event, and (iii) there already exists in the spacetime database a data object that corresponds to a spacetime event specified by the second user for which the center of the spatial portion of its corresponding spacetime event lies inside the spatial portion of the first spacetime event.

10. The system of claim 9 wherein each spacetime event corresponds to one or more parallelepipeds or one or more cylinders in a three dimensional coordinate system in which two of the dimensions are spatial and refer to points on the surface of the earth and the third dimension is time.

11. The system of claim 9 wherein each spacetime event corresponds to a parallelepiped in a three dimensional coordinate system in which the spatial portion of the spacetime event is a two dimensional rectangular area on the surface of the earth and the temporal portion is a time interval.

12. The system of claim 9 wherein the given spatial or temporal relationship is the intersection of the two spacetime events.

13. The system of claim 9 wherein the processor is further programmed to provide to the website an interactive map and said enabling a user to specify a spacetime event comprises enabling the user to indicate the spatial portion of the spacetime event on the interactive map.

14. The system of claim 11 wherein said enabling a user to specify a spacetime event comprises receiving from the website an indication of a date, and a start time and a stop time of the time interval.

15. The system of claim 13 wherein said enabling the user to indicate the spatial portion of the spacetime event means enabling the user to pan and zoom the interactive map such that a visible portion of the interactive map specifies the spatial portion of the spacetime event.

16. The system of claim 9 wherein each data object further comprises a designation of the user that specified its corresponding spacetime event, wherein the computer server further comprises:

a user database for maintaining records for users, each record corresponding to a user and including an electronic address and a personal photo;

and wherein said processor is further programmed:

to retrieve from the record in the user database that corresponds to the first user the included personal photo;

to provide the retrieved personal photo to the website for display to the second user; and wherein the website further enables the second user to send an electronic message to the electronic address included in the retrieved record.

17. The method of claim 1 wherein the time when the second user specifies the second spacetime event is either substantially before or substantially after the time interval specified in the second spacetime event.

18. The system of claim 9 wherein the time when the second user specifies the second spacetime event is either substantially before or substantially after the time interval specified in the second spacetime event.

* * * * *